US012781607B2

(12) United States Patent
Hinderliter et al.

(10) Patent No.: US 12,781,607 B2
(45) Date of Patent: Nov. 3, 2026

(54) CHEMICAL ADDITIVE TRAILER FOR HYDRAULIC FRACTURING OPERATIONS

(71) Applicant: ProFrac Holdings II, LLC, Willow Park, TX (US)

(72) Inventors: Brandon N. Hinderliter, Porter, TX (US); Corey Donaldson, Weatherford, TX (US)

(73) Assignee: ProFrac Holdings II, LLC, Willow Park, TX (US)

( * ) Notice: Subject to any disclaimer, the term of this patent is extended or adjusted under 35 U.S.C. 154(b) by 0 days.

(21) Appl. No.: 18/789,345

(22) Filed: Jul. 30, 2024

(65) Prior Publication Data

US 2026/0036028 A1 Feb. 5, 2026

(51) Int. Cl.
*E21B 43/26* (2006.01)
*E21B 21/06* (2006.01)
(Continued)

(52) U.S. Cl.
CPC ........ *E21B 43/2607* (2020.05); *E21B 21/062* (2013.01); *F04B 17/03* (2013.01);
(Continued)

(58) Field of Classification Search
CPC .. E21B 43/2607; E21B 43/267; E21B 21/062; F04B 17/03; F04B 49/06; F04B 49/20; B01F 2101/49; F04D 13/06
See application file for complete search history.

(56) References Cited

U.S. PATENT DOCUMENTS 1,656,861 A 1/1928 Leonard
1,671,436 A 5/1928 Melott
(Continued)

FOREIGN PATENT DOCUMENTS

CA 2406801 11/2001
CA 2707269 12/2010
(Continued)

OTHER PUBLICATIONS

Non-Final Office Action Mailed Sep. 2, 2020 in U.S. Appl. No. 16/356,263.
(Continued)

*Primary Examiner* — Loren C Edwards
(74) *Attorney, Agent, or Firm* — Henry Patent Law Firm PLLC

(57) ABSTRACT

In a general aspect, chemical additives are provided for a hydraulic fracture treatment. In some cases, a method for providing chemical additives includes operating a chemical pump of at least one chemical pump installed on a chemical additive trailer to pump chemical additives from at least one chemical source to at least one blender trailer. A chemical additive is received from a chemical source at a pump inlet of the chemical pump. The chemical additive is discharged at a specified chemical additive flow rate. The specified chemical additive flow rate is below, for example, 0.165 gallons per minute. The chemical additive is provided from the pump outlet to a blender trailer for addition to a fracturing slurry. At least one electric motor is operated to drive the at least one chemical pump. At least one variable frequency drive is operated to control the at least one electric motor.

19 Claims, 6 Drawing Sheets

(51) Int. Cl.
*F04B 17/03* (2006.01)
*F04B 49/06* (2006.01)
*F04B 49/20* (2006.01)
*B01F 101/49* (2022.01)

(52) U.S. Cl.
CPC .............. *F04B 49/06* (2013.01); *F04B 49/20* (2013.01); *B01F 2101/49* (2022.01)

(56) References Cited

U.S. PATENT DOCUMENTS

| | | | |
|---|---|---|---|
| 2,004,077 A | | 6/1935 | Mccartney et al. |
| 2,183,364 A | | 12/1939 | Bailey |
| 2,220,622 A | | 11/1940 | Homer |
| 2,248,051 A | | 7/1941 | Armstrong et al. |
| 2,407,796 A | | 9/1946 | Page |
| 2,416,848 A | | 3/1947 | Stewart |
| 2,610,741 A | | 9/1952 | Schmid |
| 2,753,940 A | | 7/1956 | Bonner |
| 2,976,025 A | | 3/1961 | Pro |
| 3,055,682 A | | 9/1962 | Bacher et al. |
| 3,061,039 A | | 10/1962 | Peters |
| 3,066,503 A | | 12/1962 | Fleming et al. |
| 3,302,069 A | | 1/1967 | Wilcox |
| 3,334,495 A | | 8/1967 | Jensen et al. |
| 3,722,595 A | | 3/1973 | Kiel |
| 3,764,233 A | | 10/1973 | Strickland |
| 3,773,140 A | | 11/1973 | Mahajan et al. |
| 3,837,179 A | | 9/1974 | Barth |
| 3,849,662 A | | 11/1974 | Blaskowski et al. |
| 3,878,884 A | | 4/1975 | Raleigh |
| 3,881,551 A | | 5/1975 | Terry et al. |
| 4,037,431 A | | 7/1977 | Sugimoto |
| 4,100,822 A | | 7/1978 | Rosman |
| 4,151,575 A | | 4/1979 | Hogue |
| 4,226,299 A | | 10/1980 | Hansen |
| 4,265,266 A | | 5/1981 | Kierbow et al. |
| 4,411,313 A | | 10/1983 | Johnson et al. |
| 4,432,064 A | | 2/1984 | Barker et al. |
| 4,442,665 A | | 4/1984 | Fick et al. |
| 4,456,092 A | | 6/1984 | Kubozuka et al. |
| 4,506,982 A | | 3/1985 | Smithers et al. |
| 4,512,387 A | | 4/1985 | Rodriguez et al. |
| 4,529,887 A | | 7/1985 | Johnson |
| 4,538,916 A | | 9/1985 | Zimmerman |
| 4,601,629 A | | 7/1986 | Zimmerman |
| 4,676,063 A | | 6/1987 | Goebel et al. |
| 4,759,674 A | | 7/1988 | Schröder et al. |
| 4,768,884 A | | 9/1988 | Elkin et al. |
| 4,793,386 A | | 12/1988 | Sloan |
| 4,845,981 A | | 7/1989 | Pearson |
| 4,922,463 A | | 5/1990 | Del Zotto et al. |
| 5,004,400 A | | 4/1991 | Handke |
| 5,006,044 A | | 4/1991 | Walker, Sr. et al. |
| 5,025,861 A | | 6/1991 | Huber et al. |
| 5,050,673 A | | 9/1991 | Baldridge |
| 5,114,239 A | | 5/1992 | Allen |
| 5,130,628 A | | 7/1992 | Owen |
| 5,131,472 A | | 7/1992 | Dees et al. |
| 5,172,009 A | | 12/1992 | Mohan |
| 5,189,388 A | | 2/1993 | Mosley et al. |
| 5,230,366 A | | 7/1993 | Marandi |
| 5,334,899 A | | 8/1994 | Skybyk |
| 5,366,324 A | | 11/1994 | Arlt |
| 5,422,550 A | | 6/1995 | Mcclanahan et al. |
| 5,433,243 A | | 7/1995 | Griswold et al. |
| 5,439,066 A | | 8/1995 | Gipson |
| 5,486,047 A | | 1/1996 | Zimmerman |
| 5,517,822 A | | 5/1996 | Haws et al. |
| 5,548,093 A | | 8/1996 | Sato et al. |
| 5,590,976 A | | 1/1997 | Kilheffer et al. |
| 5,655,361 A | | 8/1997 | Kishi |
| 5,736,838 A | | 4/1998 | Dove et al. |
| 5,755,096 A | | 5/1998 | Holleyman |
| 5,790,972 A | | 8/1998 | Kohlenberger |
| 5,798,596 A | | 8/1998 | Lordo |
| 5,813,455 A | | 9/1998 | Pratt et al. |
| 5,865,247 A | | 2/1999 | Paterson |
| 5,879,137 A | | 3/1999 | Yie |
| 5,894,888 A | | 4/1999 | Wiemers et al. |
| 5,907,970 A | | 6/1999 | Havlovick et al. |
| 5,950,726 A | | 9/1999 | Roberts |
| 6,007,227 A | * | 12/1999 | Carlson ................. E21B 43/267 700/265 |
| 6,035,265 A | | 3/2000 | Dister et al. |
| 6,097,310 A | | 8/2000 | Harrell et al. |
| 6,121,705 A | | 9/2000 | Hoong |
| 6,138,764 A | | 10/2000 | Scarsdale et al. |
| 6,142,878 A | | 11/2000 | Barin |
| 6,164,910 A | | 12/2000 | Mayleben |
| 6,202,702 B1 | | 3/2001 | Ohira et al. |
| 6,208,098 B1 | | 3/2001 | Kume et al. |
| 6,254,462 B1 | | 7/2001 | Kelton et al. |
| 6,271,637 B1 | | 8/2001 | Kushion |
| 6,273,193 B1 | | 8/2001 | Hermann et al. |
| 6,315,523 B1 | | 11/2001 | Mills |
| 6,442,942 B1 | | 9/2002 | Kopko |
| 6,477,852 B2 | | 11/2002 | Dodo et al. |
| 6,484,490 B1 | | 11/2002 | Olsen et al. |
| 6,491,098 B1 | | 12/2002 | Dallas |
| 6,529,135 B1 | | 3/2003 | Bowers et al. |
| 6,585,455 B1 | | 7/2003 | Petersen et al. |
| 6,626,646 B2 | | 9/2003 | Rajewski |
| 6,719,900 B2 | | 4/2004 | Hawkins |
| 6,765,304 B2 | | 7/2004 | Baten et al. |
| 6,776,227 B2 | | 8/2004 | Beida et al. |
| 6,788,022 B2 | | 9/2004 | Sopko et al. |
| 6,802,690 B2 | | 10/2004 | Han et al. |
| 6,808,303 B2 | | 10/2004 | Fisher |
| 6,931,310 B2 | | 8/2005 | Shimizu et al. |
| 6,936,947 B1 | | 8/2005 | Leijon et al. |
| 6,985,750 B1 | | 1/2006 | Vicknair et al. |
| 7,082,993 B2 | | 8/2006 | Ayoub et al. |
| 7,104,233 B2 | | 9/2006 | Ryczek |
| 7,170,262 B2 | | 1/2007 | Pettigrew |
| 7,173,399 B2 | | 2/2007 | Sihler et al. |
| 7,308,933 B1 | | 12/2007 | Mayfield |
| 7,312,593 B1 | | 12/2007 | Streicher et al. |
| 7,336,514 B2 | | 2/2008 | Amarillas et al. |
| 7,445,041 B2 | | 11/2008 | O'Brien |
| 7,494,263 B2 | | 2/2009 | Dykstra et al. |
| 7,500,642 B2 | | 3/2009 | Cunningham et al. |
| 7,525,264 B2 | | 4/2009 | Dodge |
| 7,563,076 B2 | | 7/2009 | Brunet et al. |
| 7,581,379 B2 | | 9/2009 | Yoshida et al. |
| 7,675,189 B2 | | 3/2010 | Grenier |
| 7,683,499 B2 | | 3/2010 | Saucier |
| 7,717,193 B2 | | 5/2010 | Egilsson et al. |
| 7,755,310 B2 | | 7/2010 | West et al. |
| 7,795,830 B2 | | 9/2010 | Johnson |
| 7,807,048 B2 | | 10/2010 | Collette |
| 7,835,140 B2 | | 11/2010 | Mori et al. |
| 7,845,413 B2 | | 12/2010 | Shampine et al. |
| 7,926,562 B2 | | 4/2011 | Poitzsch et al. |
| 7,977,824 B2 | | 7/2011 | Halen et al. |
| 7,984,757 B1 | | 7/2011 | Keast et al. |
| 8,037,936 B2 | | 10/2011 | Neuroth et al. |
| 8,054,084 B2 | | 11/2011 | Schulz et al. |
| 8,083,504 B2 | | 12/2011 | Williams et al. |
| 8,091,928 B2 | | 1/2012 | Carrier et al. |
| 8,096,354 B2 | | 1/2012 | Poitzsch |
| 8,096,891 B2 | | 1/2012 | Lochtefeld et al. |
| 8,139,383 B2 | | 3/2012 | Efraimsson et al. |
| 8,146,665 B2 | | 4/2012 | Neal |
| 8,154,419 B2 | | 4/2012 | Daussin et al. |
| 8,232,892 B2 | | 7/2012 | Overholt et al. |
| 8,261,528 B2 | | 9/2012 | Chillar et al. |
| 8,272,439 B2 | | 9/2012 | Strickland |
| 8,310,272 B2 | | 11/2012 | Quarto |
| 8,354,817 B2 | | 1/2013 | Yeh et al. |
| 8,474,521 B2 | | 7/2013 | Kajaria et al. |
| 8,506,267 B2 | | 8/2013 | Gambier et al. |
| 8,534,235 B2 | | 9/2013 | Chandler |
| 8,573,303 B2 | | 11/2013 | Kerfoot |

(56) References Cited

U.S. PATENT DOCUMENTS 8,596,056 B2 12/2013 Woodmansee et al.
8,616,005 B1 12/2013 Cousino, Sr.
8,616,274 B2 12/2013 Belcher et al.
8,646,521 B2 2/2014 Bowen
8,692,408 B2 4/2014 Zhang et al.
8,727,068 B2 5/2014 Bruin
8,760,657 B2 6/2014 Pope et al.
8,763,387 B2 7/2014 Schmidt
8,774,972 B2 7/2014 Rusnak et al.
8,789,601 B2 7/2014 Broussard et al.
8,795,525 B2 8/2014 Mcginnis et al.
8,800,652 B2 8/2014 Bartko et al.
8,807,960 B2 8/2014 Stephenson et al.
8,838,341 B2 9/2014 Kumano
8,851,860 B1 10/2014 Mail
8,857,506 B2 10/2014 Stone, Jr. et al.
8,899,940 B2 12/2014 Leugemors et al.
8,905,056 B2 12/2014 Kendrick
8,905,138 B2 12/2014 Lundstedt et al.
8,997,904 B2 4/2015 Cryer et al.
9,018,881 B2 4/2015 Mao et al.
9,051,822 B2 6/2015 Ayan et al.
9,051,923 B2 6/2015 Kuo
9,061,223 B2 6/2015 Winborn
9,062,545 B2 6/2015 Roberts et al.
9,067,182 B2 6/2015 Nichols et al.
9,103,193 B2 8/2015 Coli et al.
9,119,326 B2 8/2015 Mcdonnell et al.
9,121,257 B2 9/2015 Coli et al.
9,140,105 B2 9/2015 Pattillo
9,140,110 B2 9/2015 Coli et al.
9,160,168 B2 10/2015 Chapel et al.
9,169,706 B2 10/2015 Kellam, III
9,260,253 B2 2/2016 Naizer et al.
9,322,239 B2 4/2016 Angeles Boza et al.
9,324,049 B2 4/2016 Thomeer et al.
9,340,353 B2 5/2016 Oren et al.
9,353,593 B1 5/2016 Lu et al.
9,366,114 B2 6/2016 Coli et al.
9,410,410 B2 8/2016 Broussard et al.
9,450,385 B2 9/2016 Kristensen
9,475,020 B2 10/2016 Coli et al.
9,475,021 B2 10/2016 Coli et al.
9,482,086 B2 11/2016 Richardson et al.
9,499,335 B2 11/2016 Mciver et al.
9,506,333 B2 11/2016 Castillo et al.
9,513,055 B1 12/2016 Seal
9,534,473 B2 1/2017 Morris et al.
9,562,420 B2 2/2017 Morris et al.
9,587,649 B2 3/2017 Oehring
9,611,728 B2 4/2017 Oehring
9,650,871 B2 5/2017 Oehring et al.
9,650,879 B2 5/2017 Broussard et al.
9,706,185 B2 7/2017 Ellis
9,728,354 B2 8/2017 Skolozdra et al.
9,738,461 B2 8/2017 Degaray et al.
9,739,546 B2 8/2017 Bertilsson et al.
9,745,840 B2 8/2017 Oehring et al.
9,790,858 B2 10/2017 Kanebako
9,840,901 B2 12/2017 Oehring et al.
9,863,228 B2 1/2018 Shampine et al.
9,893,500 B2 2/2018 Oehring et al.
9,909,398 B2 3/2018 Pham
9,915,128 B2 3/2018 Hunter
9,932,799 B2 4/2018 Symchuk
9,945,365 B2 4/2018 Hernandez et al.
9,963,961 B2 5/2018 Hardin
9,970,278 B2 5/2018 Broussard et al.
9,976,351 B2 5/2018 Randall
9,995,218 B2 6/2018 Oehring et al.
10,008,880 B2 6/2018 Vicknair et al.
10,020,711 B2 7/2018 Oehring et al.
10,036,238 B2 7/2018 Oehring
10,107,086 B2 10/2018 Oehring et al.
10,119,381 B2 11/2018 Oehring et al.
10,184,465 B2 1/2019 Enis et al.
10,196,878 B2 2/2019 Hunter
10,221,639 B2 3/2019 Romer et al.
10,227,854 B2 3/2019 Glass
10,232,332 B2 3/2019 Oehring et al.
10,246,984 B2 4/2019 Payne et al.
10,254,732 B2 4/2019 Oehring et al.
10,260,327 B2 4/2019 Kajaria et al.
10,280,724 B2 5/2019 Hinderliter
10,287,873 B2 5/2019 Filas et al.
10,302,079 B2 5/2019 Kendrick
10,309,205 B2 6/2019 Randall
10,337,308 B2 7/2019 Broussard et al.
10,371,012 B2 8/2019 Davis et al.
10,378,326 B2 8/2019 Morris et al.
10,393,108 B2 8/2019 Chong et al.
10,407,990 B2 9/2019 Oehring et al.
10,408,030 B2 9/2019 Oehring et al.
10,408,031 B2 9/2019 Oehring et al.
10,415,332 B2 9/2019 Morris et al.
10,436,026 B2 10/2019 Ounadjela et al.
10,627,003 B2 4/2020 Dale et al.
10,648,270 B2 5/2020 Brunty et al.
10,648,311 B2 5/2020 Oehring et al.
10,669,471 B2 6/2020 Schmidt et al.
10,669,804 B2 6/2020 Kotrla et al.
10,686,301 B2 6/2020 Oehring et al.
10,695,950 B2 6/2020 Igo et al.
10,711,576 B2 7/2020 Bishop
10,731,561 B2 8/2020 Oehring et al.
10,740,730 B2 8/2020 Altamirano et al.
10,767,561 B2 9/2020 Brady
10,781,752 B2 9/2020 Kikkawa et al.
10,794,165 B2 10/2020 Fischer et al.
10,988,998 B2 4/2021 Fischer et al.
11,273,421 B2 3/2022 Stegemoeller et al.
2001/0000996 A1 5/2001 Grimland et al.
2002/0169523 A1 11/2002 Ross et al.
2003/0056514 A1 3/2003 Lohn
2003/0079875 A1 5/2003 Weng
2003/0138327 A1 7/2003 Jones et al.
2004/0040746 A1 3/2004 Niedermayr et al.
2004/0045703 A1 3/2004 Hooper et al.
2004/0102109 A1 5/2004 Cratty et al.
2004/0167738 A1 8/2004 Miller
2005/0061548 A1 3/2005 Hooper et al.
2005/0116541 A1 6/2005 Seiver
2005/0201197 A1 9/2005 Duell et al.
2005/0274508 A1 12/2005 Folk et al.
2006/0052903 A1 3/2006 Bassett
2006/0065319 A1 3/2006 Csitari
2006/0109141 A1 5/2006 Huang et al.
2007/0131410 A1 6/2007 Hill et al.
2007/0187163 A1 8/2007 Cone et al.
2007/0201305 A1 8/2007 Heilman et al.
2007/0226089 A1 9/2007 Degaray et al.
2007/0277982 A1 12/2007 Shampine et al.
2007/0278140 A1 12/2007 Mallett et al.
2008/0017369 A1 1/2008 Sarada
2008/0041596 A1 2/2008 Blount et al.
2008/0095644 A1 4/2008 Mantei et al.
2008/0112802 A1 5/2008 Orlando et al.
2008/0137266 A1 6/2008 Jensen et al.
2008/0164023 A1 7/2008 Dykstra et al.
2008/0202991 A1 8/2008 Meagher
2008/0208478 A1 8/2008 Ella et al.
2008/0217024 A1 9/2008 Moore
2008/0257449 A1 10/2008 Weinstein et al.
2008/0264625 A1 10/2008 Ochoa
2008/0264649 A1 10/2008 Crawford
2008/0277120 A1 11/2008 Hickie
2009/0045782 A1 2/2009 Datta et al.
2009/0065299 A1 3/2009 Vito et al.
2009/0072645 A1 3/2009 Quere
2009/0078410 A1 3/2009 Krenek et al.
2009/0093317 A1 4/2009 Kajiwara et al.
2009/0095482 A1 4/2009 Surjaatmadja
2009/0145611 A1 6/2009 Pallini, Jr. et al.
2009/0153354 A1 6/2009 Duassin et al.

(56) References Cited

U.S. PATENT DOCUMENTS

| | | | |
|---|---|---|---|
| 2009/0188181 | A1 | 7/2009 | Forbis et al. |
| 2009/0200035 | A1 | 8/2009 | Bjerkreim et al. |
| 2009/0260826 | A1 | 10/2009 | Sherwood et al. |
| 2009/0308602 | A1 | 12/2009 | Bruins et al. |
| 2010/0000508 | A1 | 1/2010 | Chandler |
| 2010/0019574 | A1 | 1/2010 | Baldassarre et al. |
| 2010/0038907 | A1 | 2/2010 | Hunt et al. |
| 2010/0045109 | A1 | 2/2010 | Arnold |
| 2010/0051272 | A1 | 3/2010 | Loree et al. |
| 2010/0132949 | A1 | 6/2010 | Defosse et al. |
| 2010/0146981 | A1 | 6/2010 | Motakef et al. |
| 2010/0172202 | A1 | 7/2010 | Borgstadt |
| 2010/0224365 | A1* | 9/2010 | Abad ...................... E21B 43/26 166/275 |
| 2010/0250139 | A1 | 9/2010 | Hobbs et al. |
| 2010/0293973 | A1 | 11/2010 | Erickson |
| 2010/0303655 | A1 | 12/2010 | Scekic |
| 2010/0322802 | A1 | 12/2010 | Kugelev |
| 2011/0005757 | A1 | 1/2011 | Herbert |
| 2011/0017468 | A1 | 1/2011 | Birch et al. |
| 2011/0052423 | A1 | 3/2011 | Gambier et al. |
| 2011/0061855 | A1 | 3/2011 | Case et al. |
| 2011/0081268 | A1 | 4/2011 | Ochoa et al. |
| 2011/0085924 | A1 | 4/2011 | Shampine et al. |
| 2011/0110793 | A1 | 5/2011 | Leugemors et al. |
| 2011/0166046 | A1 | 7/2011 | Weaver et al. |
| 2011/0247878 | A1 | 10/2011 | Rasheed et al. |
| 2011/0272158 | A1 | 11/2011 | Neal |
| 2012/0018016 | A1 | 1/2012 | Gibson et al. |
| 2012/0049625 | A1 | 3/2012 | Hopwood |
| 2012/0063936 | A1 | 3/2012 | Baxter et al. |
| 2012/0085541 | A1 | 4/2012 | Love et al. |
| 2012/0112757 | A1 | 5/2012 | Vrankovic et al. |
| 2012/0127635 | A1 | 5/2012 | Grindeland |
| 2012/0127822 | A1* | 5/2012 | Noles, Jr. .............. E21B 21/062 366/152.2 |
| 2012/0150455 | A1 | 6/2012 | Franklin et al. |
| 2012/0152716 | A1 | 6/2012 | Kikukawa et al. |
| 2012/0205301 | A1 | 8/2012 | Mcguire et al. |
| 2012/0205400 | A1 | 8/2012 | Degaray et al. |
| 2012/0222865 | A1 | 9/2012 | Larson et al. |
| 2012/0232728 | A1 | 9/2012 | Karimi et al. |
| 2012/0247783 | A1 | 10/2012 | Berner, Jr. et al. |
| 2012/0255734 | A1 | 10/2012 | Coli et al. |
| 2013/0009469 | A1 | 1/2013 | Gillett |
| 2013/0025706 | A1 | 1/2013 | Degaray et al. |
| 2013/0048575 | A1 | 2/2013 | Gruber |
| 2013/0051971 | A1 | 2/2013 | Wyse et al. |
| 2013/0175038 | A1 | 7/2013 | Conrad |
| 2013/0175039 | A1 | 7/2013 | Guidry |
| 2013/0180722 | A1 | 7/2013 | Olarte Caro |
| 2013/0189629 | A1 | 7/2013 | Chandler |
| 2013/0199617 | A1 | 8/2013 | Degaray et al. |
| 2013/0233542 | A1 | 9/2013 | Shampine et al. |
| 2013/0255271 | A1 | 10/2013 | Yu et al. |
| 2013/0284278 | A1 | 10/2013 | Winborn |
| 2013/0284455 | A1 | 10/2013 | Kajaria et al. |
| 2013/0299167 | A1 | 11/2013 | Fordyce et al. |
| 2013/0306322 | A1 | 11/2013 | Sanborn et al. |
| 2013/0317750 | A1 | 11/2013 | Hunter |
| 2013/0341029 | A1 | 12/2013 | Roberts et al. |
| 2013/0343858 | A1 | 12/2013 | Flusche |
| 2014/0000899 | A1 | 1/2014 | Nevison |
| 2014/0010671 | A1 | 1/2014 | Cryer et al. |
| 2014/0054965 | A1 | 2/2014 | Jain |
| 2014/0060658 | A1 | 3/2014 | Hains et al. |
| 2014/0095114 | A1 | 4/2014 | Thomeer et al. |
| 2014/0096974 | A1 | 4/2014 | Coli et al. |
| 2014/0124162 | A1 | 5/2014 | Leavitt |
| 2014/0138079 | A1 | 5/2014 | Broussard et al. |
| 2014/0174717 | A1 | 6/2014 | Broussard et al. |
| 2014/0219824 | A1 | 8/2014 | Burnette |
| 2014/0238683 | A1 | 8/2014 | Korach et al. |
| 2014/0246211 | A1 | 9/2014 | Guidry et al. |
| 2014/0251623 | A1 | 9/2014 | Lestz et al. |
| 2014/0255214 | A1 | 9/2014 | Burnette |
| 2014/0277772 | A1 | 9/2014 | Lopez et al. |
| 2014/0290768 | A1 | 10/2014 | Randle et al. |
| 2014/0379300 | A1 | 12/2014 | Devine et al. |
| 2015/0001161 | A1 | 1/2015 | Wiemers |
| 2015/0027712 | A1 | 1/2015 | Vicknair et al. |
| 2015/0053426 | A1 | 2/2015 | Smith et al. |
| 2015/0068724 | A1 | 3/2015 | Coli et al. |
| 2015/0068754 | A1 | 3/2015 | Coli et al. |
| 2015/0075778 | A1 | 3/2015 | Walters et al. |
| 2015/0083426 | A1 | 3/2015 | Lesko et al. |
| 2015/0097504 | A1 | 4/2015 | Lamascus et al. |
| 2015/0114652 | A1 | 4/2015 | Lestz et al. |
| 2015/0136043 | A1 | 5/2015 | Shaaban et al. |
| 2015/0144336 | A1 | 5/2015 | Hardin et al. |
| 2015/0147194 | A1 | 5/2015 | Foote |
| 2015/0159911 | A1 | 6/2015 | Holt |
| 2015/0175013 | A1 | 6/2015 | Cryer et al. |
| 2015/0176386 | A1 | 6/2015 | Castillo et al. |
| 2015/0211512 | A1 | 7/2015 | Wiegman et al. |
| 2015/0211524 | A1 | 7/2015 | Broussard et al. |
| 2015/0217672 | A1 | 8/2015 | Shampine et al. |
| 2015/0225113 | A1 | 8/2015 | Lungu et al. |
| 2015/0233530 | A1 | 8/2015 | Sandidge |
| 2015/0252661 | A1 | 9/2015 | Glass |
| 2015/0300145 | A1 | 10/2015 | Coli et al. |
| 2015/0300336 | A1 | 10/2015 | Hernandez et al. |
| 2015/0314225 | A1 | 11/2015 | Parsons et al. |
| 2015/0330172 | A1 | 11/2015 | Allmaras et al. |
| 2015/0354322 | A1 | 12/2015 | Vicknair et al. |
| 2016/0006311 | A1 | 1/2016 | Li |
| 2016/0032703 | A1 | 2/2016 | Broussard et al. |
| 2016/0102537 | A1 | 4/2016 | Lopez |
| 2016/0105022 | A1 | 4/2016 | Oehring et al. |
| 2016/0160889 | A1 | 6/2016 | Hoffman et al. |
| 2016/0177675 | A1 | 6/2016 | Morris et al. |
| 2016/0177678 | A1 | 6/2016 | Morris et al. |
| 2016/0186531 | A1 | 6/2016 | Harkless et al. |
| 2016/0208592 | A1 | 7/2016 | Oehring |
| 2016/0208593 | A1 | 7/2016 | Coli et al. |
| 2016/0208594 | A1 | 7/2016 | Coli et al. |
| 2016/0208595 | A1 | 7/2016 | Tang et al. |
| 2016/0221220 | A1 | 8/2016 | Paige |
| 2016/0230524 | A1 | 8/2016 | Dumoit et al. |
| 2016/0230525 | A1 | 8/2016 | Lestz et al. |
| 2016/0230660 | A1 | 8/2016 | Zeitoun et al. |
| 2016/0258267 | A1 | 9/2016 | Payne et al. |
| 2016/0265457 | A1 | 9/2016 | Stephenson et al. |
| 2016/0273328 | A1 | 9/2016 | Oehring |
| 2016/0273456 | A1 | 9/2016 | Zhang |
| 2016/0281484 | A1 | 9/2016 | Lestz et al. |
| 2016/0290114 | A1 | 10/2016 | Oehring et al. |
| 2016/0290563 | A1 | 10/2016 | Diggins |
| 2016/0312108 | A1 | 10/2016 | Lestz et al. |
| 2016/0319650 | A1 | 11/2016 | Oehring et al. |
| 2016/0326853 | A1 | 11/2016 | Fredd et al. |
| 2016/0326854 | A1 | 11/2016 | Broussard et al. |
| 2016/0326855 | A1 | 11/2016 | Coli et al. |
| 2016/0341281 | A1 | 11/2016 | Brunvold et al. |
| 2016/0348479 | A1 | 12/2016 | Oehring et al. |
| 2016/0349728 | A1 | 12/2016 | Oehring et al. |
| 2016/0369609 | A1 | 12/2016 | Morris et al. |
| 2017/0016433 | A1 | 1/2017 | Chong et al. |
| 2017/0021318 | A1 | 1/2017 | Mciver |
| 2017/0022788 | A1 | 1/2017 | Oehring et al. |
| 2017/0022807 | A1 | 1/2017 | Dursun et al. |
| 2017/0028368 | A1 | 2/2017 | Oehring et al. |
| 2017/0030177 | A1 | 2/2017 | Oehring et al. |
| 2017/0030178 | A1 | 2/2017 | Oehring et al. |
| 2017/0036178 | A1 | 2/2017 | Coli et al. |
| 2017/0036872 | A1 | 2/2017 | Wallace |
| 2017/0037717 | A1 | 2/2017 | Oehring et al. |
| 2017/0037718 | A1 | 2/2017 | Coli et al. |
| 2017/0043280 | A1 | 2/2017 | Vankouwenberg |
| 2017/0051732 | A1 | 2/2017 | Hernandez et al. |
| 2017/0074076 | A1 | 3/2017 | Joseph et al. |
| 2017/0082033 | A1 | 3/2017 | Wu et al. |
| 2017/0096885 | A1 | 4/2017 | Oehring et al. |
| 2017/0096889 | A1 | 4/2017 | Blanckaert et al. |

(56) References Cited

U.S. PATENT DOCUMENTS

2017/0104389 A1 4/2017 Morris et al.
2017/0114625 A1 4/2017 Norris et al.
2017/0115674 A1* 4/2017 Lopez .................. F04D 15/029
2017/0130743 A1 5/2017 Anderson
2017/0138171 A1 5/2017 Richards et al.
2017/0145918 A1 5/2017 Oehring et al.
2017/0146189 A1 5/2017 Herman et al.
2017/0159570 A1 6/2017 Bickert
2017/0159654 A1 6/2017 Kendrick
2017/0175516 A1 6/2017 Eslinger
2017/0204852 A1 7/2017 Barnett, Jr.
2017/0212535 A1 7/2017 Shelman et al.
2017/0218727 A1 8/2017 Oehring et al.
2017/0218843 A1 8/2017 Oehring et al.
2017/0222409 A1 8/2017 Oehring et al.
2017/0226838 A1 8/2017 Ciezobka et al.
2017/0226839 A1 8/2017 Broussard et al.
2017/0226842 A1 8/2017 Omont et al.
2017/0234250 A1 8/2017 Janik
2017/0241221 A1 8/2017 Seshadri et al.
2017/0259227 A1 9/2017 Morris et al.
2017/0292513 A1 10/2017 Haddad et al.
2017/0313499 A1 11/2017 Hughes et al.
2017/0314380 A1 11/2017 Oehring et al.
2017/0314979 A1 11/2017 Ye et al.
2017/0328179 A1 11/2017 Dykstra et al.
2017/0369258 A1 12/2017 Degaray et al.
2017/0370639 A1 12/2017 Bardon et al.
2018/0028992 A1 2/2018 Stegemoeller et al.
2018/0038216 A1 2/2018 Zhang et al.
2018/0045331 A1 2/2018 Lopez et al.
2018/0090914 A1 3/2018 Johnson et al.
2018/0156210 A1 6/2018 Oehring et al.
2018/0181830 A1 6/2018 Luharuka et al.
2018/0183219 A1 6/2018 Oehring et al.
2018/0216455 A1 8/2018 Andreychuk et al.
2018/0238147 A1 8/2018 Shahri et al.
2018/0245428 A1 8/2018 Richards
2018/0258746 A1 9/2018 Broussard et al.
2018/0259080 A1 9/2018 Dale et al.
2018/0266217 A1 9/2018 Funkhouser et al.
2018/0266412 A1 9/2018 Stokkevåg et al.
2018/0274446 A1 9/2018 Oehring et al.
2018/0284817 A1 10/2018 Cook et al.
2018/0291713 A1 10/2018 Jeanson
2018/0298731 A1 10/2018 Bishop et al.
2018/0312738 A1 11/2018 Rutsch et al.
2018/0313677 A1 11/2018 Warren et al.
2018/0320483 A1 11/2018 Zhang et al.
2018/0343125 A1 11/2018 Clish et al.
2018/0363437 A1 12/2018 Coli et al.
2018/0363640 A1 12/2018 Kajita et al.
2018/0366950 A1 12/2018 Pedersen et al.
2019/0003329 A1 1/2019 Morris et al.
2019/0010793 A1* 1/2019 Hinderliter ........... H02P 27/047
2019/0040727 A1 2/2019 Oehring et al.
2019/0063309 A1 2/2019 Davis
2019/0100989 A1 4/2019 Stewart et al.
2019/0112910 A1 4/2019 Oehring et al.
2019/0119096 A1 4/2019 Haile et al.
2019/0120024 A1 4/2019 Oehring et al.
2019/0128080 A1 5/2019 Ross et al.
2019/0128104 A1 5/2019 Graham et al.
2019/0145251 A1 5/2019 Johnson
2019/0154020 A1 5/2019 Glass
2019/0162061 A1 5/2019 Stephenson
2019/0169971 A1 6/2019 Oehring et al.
2019/0178057 A1 6/2019 Hunter
2019/0178235 A1 6/2019 Coskrey et al.
2019/0203567 A1 7/2019 Ross et al.
2019/0203572 A1 7/2019 Morris et al.
2019/0211661 A1 7/2019 Reckels et al.
2019/0226317 A1 7/2019 Payne et al.
2019/0245348 A1 8/2019 Hinderliter et al.
2019/0249527 A1 8/2019 Kraynek
2019/0257462 A1 8/2019 Rogers
2019/0292866 A1 9/2019 Ross et al.
2019/0292891 A1 9/2019 Kajaria
2019/0316447 A1 10/2019 Oehring et al.
2020/0040878 A1 2/2020 Morris
2020/0047141 A1 2/2020 Oehring et al.
2020/0088152 A1 3/2020 Alloin
2020/0095854 A1 3/2020 Hinderliter
2020/0232454 A1 7/2020 Chretien et al.
2020/0325760 A1 10/2020 Markham
2020/0350790 A1 11/2020 Luft et al.
2022/0403723 A1* 12/2022 Yeung .................. B01F 23/581
2024/0280009 A1 8/2024 Hinderliter

FOREIGN PATENT DOCUMENTS

| | | |
|---|---|---|
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 | 1/2019 |
| CA | 2919649 | 2/2019 |
| CA | 2919666 | 7/2019 |
| CA | 2797081 | 9/2019 |
| CA | 2945579 | 10/2019 |
| CN | 101977016 | 2/2011 |
| CN | 104117308 | 10/2014 |
| CN | 104196613 | 12/2014 |
| CN | 205986303 | 2/2017 |
| CN | 108049999 | 5/2018 |
| CN | 112196508 | 1/2021 |
| JP | 2004264589 | 9/2004 |
| WO | 2009046280 | 4/2009 |
| WO | 2014177346 | 11/2014 |
| WO | 2016144939 | 9/2016 |
| WO | 2016160458 | 10/2016 |
| WO | 2018044307 | 3/2018 |
| WO | 2018213925 | 11/2018 |
| WO | 2019210417 | 11/2019 |

OTHER PUBLICATIONS

Non-Final Office Action Mailed Sep. 29, 2020 in U.S. Appl. No. 16/943,727.
Non-Final Office Mailed Oct. 26, 2020 in U.S. Appl. No. 15/356,436.
Non-Final Office Mailed Oct. 5, 2020 in U.S. Appl. No. 16/443,273.
Notice of Allowance and Notice of Allowability issued in U.S. Appl. No. 15/829,419 mailed Jul. 26, 2021.
Notice of Allowance issued in corresponding U.S. Appl. No. 14/622,532 dated Mar. 27, 2017.
Notice of Allowance issued in corresponding U.S. Appl. No. 15/217,040 dated Mar. 28, 2017.
Notice of Allowance mailed Jan. 9, 2020 in related U.S. Appl. No. 16/570,331.
Office Action dated Apr. 10, 2018 in related U.S. Appl. No. 15/294,349.
Office Action dated Apr. 2, 2018 in related U.S. Appl. No. 15/183,387.
Office Action dated Jul. 25, 2018 in related U.S. Appl. No. 15/644,487.
Office Action dated May 29, 2018 in related U.S. Appl. No. 15/235,716.
Office Action dated Oct. 4, 2018 in related U.S. Appl. No. 15/217,081.
Office Action mailed Aug. 19, 2019 in related U.S. Appl. No. 15/356,436.
Office Action mailed Aug. 4, 2020 in related U.S. Appl. No. 16/385,070.
Office Action mailed Dec. 12, 2018 in related U.S. Appl. No. 16/160,708.

(56) References Cited

OTHER PUBLICATIONS

Office Action mailed Jan. 30, 2019 in related Canadian Patent Application No. 2,936,997.
Office Action mailed Jun. 11, 2019 in corresponding U.S. Appl. No. 16/210,749.
Office Action mailed Jun. 22, 2020 in relate U.S. Appl. No. 16/377,861.
Office Action mailed Jun. 29, 2020 in related U.S. Appl. No. 16/728,359.
Office Action mailed Jun. 7, 2019 in corresponding U.S. Appl. No. 16/170,695.
Office Action mailed Mar. 1, 2019 in related Canadian Patent Application No. 2,943,275.
Office Action mailed May 10, 2019 in corresponding U.S. Appl. No. 16/268,030.
Office Action mailed Oct. 11, 2019 in related U.S. Appl. No. 16/385,070.
Office Action mailed Oct. 2, 2019 in related U.S. Appl. No. 16/152,732.
Office Action mailed Sep. 11, 2019 in related U.S. Appl. No. 16/268,030.
Office Action mailed Sep. 20, 2019 in related U.S. Appl. No. 16/443,273.
Office Action mailed Sep. 3, 2019 in related U.S. Appl. No. 15/994,772.
Woodbury et al., "Electrical Design Considerations for Drilling Rigs," IEEE Transactions on Industry Applications, vol. 1A-12, No. 4, Jul./Aug. 1976, pp. 421-431.
Uspto, Non-Final Office Action issued in U.S. Appl. No. 16/404,283 on Mar. 7, 2024, 12 pages.
Baldor Reliance , "Product Information Packet CECP3665T", 2023, 13 pages.
Cherry-Burrell, Waukesha , "Universal® 1 Series Rotary Positive Displacement Pumps", 2019, 12 pages.
LS Electric , "Fan and Pump Drive H100", 2020, 84 pages.
UK Power Networks , "Transformers to Supply Heat to Tate Modern", UK Power Networks, from press releases May 16, 2013.
International Search Report and Written Opinion mailed Jul. 22, 2020 in corresponding PCT Application No. PCT/US20/00017.
International Search Report and Written Opinion mailed Jul. 9, 2019 in corresponding PCT Application No. PCT/US2019/027584.
International Search Report and Written Opinion mailed Jun. 23, 2020 in corresponding PCT Application No. PCT/US20/23912.
International Search Report and Written Opinion mailed Mar. 5, 2019 in related PCT Application No. PCT/US18/63970.
International Search Report and Written Opinion mailed Nov. 26, 2019 in related PCT Application No. PCT/US19/51018.
International Search Report and Written Opinion mailed Sep. 11, 2019 in related PCT Application No. PCT/US2019/037493.
International Search Report and Written Opinion Mailed Sep. 3, 2020 in PCT/US2020/36932.
Kroposki et al., Making Microgrids Work, 6 IEEE Power and Energy Mag. 40, 41 (2008).
Morris et al., U.S. Appl. No. 62/526,869; Hydration-Blender Transport and Electric Power Distribution for Fracturing Operation; Jun. 28, 2018; USPTO; see entire document.
Non-Final Office Action issued in corresponding U.S. Appl. No. 14/622,532 dated May 17, 2016.
Non-Final Action issued in corresponding U.S. Appl. No. 15/293,681 dated Feb. 16, 2017.
Non-Final Office Action dated Mar. 3, 2020 corresponding to U.S. Appl. No. 16/152,695.
Non-Final Office Action dated Oct. 4, 2018 in related U.S. Appl. No. 15/217,081.
Non-Final Office Action issued in corresponding U.S. Appl. No. 15/291,842 dated Jan. 6, 2017.
Non-Final Office Action issued in corresponding U.S. Appl. No. 14/622,532 dated Aug. 5, 2015.
Non-Final Office Action issued in corresponding U.S. Appl. No. 14/884,363 dated Sep. 5, 2017.
Non-Final Office Action issued in corresponding U.S. Appl. No. 15/145,443 dated Feb. 7, 2017.
Non-Final Office Action issued in Corresponding U.S. Appl. No. 15/145,491 on May 15, 2017.
Non-Final Office Action issued in corresponding U.S. Appl. No. 15/145,491 on Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/294,349 dated Mar. 14, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Non-Final Office Action issued in U.S. Appl. No. 16/404,283 mailed Jul. 21, 2021.
Non-Final Office Action issued in U.S. Appl. No. 16/871,928 mailed Aug. 25, 2021.
Non-Final Office Action issued in U.S. Appl. No. 16/901,774 mailed Sep. 14, 2021.
Non-Final Office Action issued in U.S. Appl. No. 16/943,727 mailed Aug. 3, 2021.
Non-Final Office Action issued in U.S. Appl. No. 17/060,647 mailed Sep. 20, 2021.
Non-Final Office Action issued in U.S. Appl. No. 14/881,535 mailed May 20, 2020.
Non-Final Office Action issued in U.S. Appl. No. 15/145,443 mailed May 8, 2020.
Non-Final Office Action issued in U.S. Appl. No. 16/458,696 mailed May 22, 2020.
Non-Final Office Action issued in U.S. Appl. No. 16/564,186, mailed Oct. 15, 2021.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action issued Nov. 13, 2017 in related U.S. Appl. No. 15/644,487.
Non-Final Office Action issued Nov. 29, 2017 in related U.S. Appl. No. 15/145,414.
Non-Final Office Action issued Oct. 6, 2017 in related U.S. Appl. No. 14/881,535.
Non-Final Office action Mailed Aug. 31, 2020 in U.S. Appl. No. 16/167,083.
Non-Final Office Action mailed Dec. 23, 2019 in related U.S. Appl. No. 16/597,008.
Non-Final Office Action mailed Dec. 6, 2019 in related U.S. Appl. No. 16/564,186.
Non-final Office Action mailed Feb. 12, 2019 in related U.S. Appl. No. 16/170,695.
Non-Final Office Action mailed Feb. 25, 2019 in related U.S. Appl. No. 16/210,749.
Non-Final Office Action mailed Jan. 10, 2020 in related U.S. Appl. No. 16/597,014.
Non-Final Office Action mailed Jan. 29, 2021 in U.S. Appl. No. 16/564,185.
Non-Final Office Action mailed Jan. 4, 2021 in U.S. Appl. No. 16/522,043.
Non-Final Office Action mailed Mar. 6, 2019 in related U.S. Appl. No. 15/183,387.
USPTO, Non-Final Office Action issued in U.S. Appl. No. 18/653,381 on Feb. 21, 2025, 85 pages.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
"Process Burner" (https://www.cebasrt.com/productsloii-gaslprocess-burner) 06 Sep. 6, 2018 (Sep. 6, 2018), entire document, especially para (Burners for refinery Heaters).

(56) References Cited

OTHER PUBLICATIONS

Water and Glycol Heating Systems (https://www.heat-inc.com/wg-series-water-glycol-systems/) Jun. 18, 2018 (Jun. 18, 2018), entire document, especially WG Series Water Glycol Systems.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Jun. 22, 2018 in related Canadian Patent Application No. 2,886,697.
Canadian Office Action dated Mar. 2, 2018 in related Canadian Patent Application No. 2,833,711.
Canadian Office Action dated Sep. 28, 2018 in related Canadian Patent Application No. 2,945,281.
Canadian Office Action issued Aug. 31, 2020 in Candian Patent Application No. 2,944,980.
Canadian Office Action issued in Canadian Application No. 3,094,768 mailed Oct. 28, 2021.
Canadian Office Action issued Sep. 22, 2020 in Canadian Application No. 2,982,974.
Canadian Office Action issued Sep. 8, 2020 in Candian Patent Application No. 2,928,707.
Canadian Office Action mailed Aug. 17, 2020 in related CA Patent Application No. 2,944,968.
Canadian Office Action mailed Aug. 18, 2020 in related CA Patent Application No. 2,933,444.
Canadian Office Action mailed Jun. 20, 2019 in corresponding CA Application No. 2,964,597.
Canadian Office Action mailed May 30, 2019 in corresponding CA Application No. 2,833,711.
Canadian Office Action mailed Oct. 1, 2019 in related Canadian Patent Application No. 2,936,997.
Dan T. Ton & Merrill A. Smith, The U.S. Department of Energy's Microgrid Initiative, 25 the Electricity J. 84 (2012), pp. 84-94.
Final Office Action dated Mar. 31, 2020 corresponding to U.S. Appl. No. 15/356,436.
Final Office Action issued in corresponding U.S. Appl. No. 14/622,532 dated Dec. 21, 2015.
Final Office Action issued in corresponding U.S. Appl. No. 14/622,532 dated Dec. 7, 2016.
Final Office Action issued in corresponding U.S. Appl. No. 15/145,491 dated Jan. 20, 2017.
Final Office Action issued in corresponding U.S. Appl. No. 15/145,491 dated Sep. 6, 2017.
Final Office Action issued in corresponding U.S. Appl. No. 15/294,349 dated Jul. 6, 2017.
Final Office Action issued in U.S. Appl. No. 16/356,263 mailed Oct. 7, 2021.
Final Office Action mailed Feb. 4, 2021 in U.S. Appl. No. 16/597,014.
Final Office Action mailed Jan. 11, 2021 in U.S. Appl. No. 16/404,283.
Final Office Action mailed Jan. 21, 2021 in U.S. Appl. No. 16/458,696.
Goodwin, "High-voltage auxiliary switchgear for power stations," Power Engineering Journal, 1989, 10 pg. (Year 1989).
International Search and Report and Written Opinion mailed Jan. 2, 2019 in related PCT Patent Application No. PCT/US18/54542.
International Search and Written Opinion Mailed Aug. 28, 2020 in PCT/US20/23821.
International Search report and Written Opinion dated Sep. 19, 2018 in related PCT Patent Application No. PCT/US2018/040683.
International Search Report and Written Opinion issued in PCT/US2020/023809 mailed Jun. 2, 2020.
International Search Report and Written Opinion mailed Apr. 10, 2019 in corresponding PCT Application No. PCT/US2019/016635.
International Search Report and Written Opinion mailed Dec. 14, 2020 in PCT/US2020/53980.
International Search Report and Written Opinion mailed Dec. 31, 2018 in related PCT Patent Application No. PCT/US18/55913.
International Search Report and Written Opinion mailed Feb. 11, 2020 in related PCT Application No. PCT/US2019/055323.
International Search Report and Written Opinion mailed Feb. 15, 2019 in related PCT Application No. PCT/US18/63977.
International Search Report and Written Opinion mailed Feb. 2, 2021 in PCT/US20/58906.
International Search Report and Written Opinion mailed Feb. 3, 2021 in PCT/US20/58899.
International Search Report and Written Opinion mailed Feb. 4, 2021 in PCT/US20/59834.
International Search Report and Written Opinion mailed in PCT/US/67526 mailed May 6, 2021.
International Search Report and Written Opinion mailed in PCT/US20/67146 mailed Mar. 29, 2021.
International Search Report and Written Opinion mailed in PCT/US20/67523 mailed Mar. 22, 2021.
International Search Report and Written Opinion mailed in PCT/US20/67528 mailed Mar. 19, 2021.
International Search Report and Written Opinion mailed in PCT/US20/67608 mailed Mar. 30, 2021.
International Search Report and Written Opinion mailed in PCT/US2020/066543 mailed May 11, 2021.
International Search Report and Written Opinion mailed Jan. 2, 2019 in related PCT Patent Application No. PCT/US18/54548.
International Search Report and Written Opinion mailed Jan. 2, 2020 in related PCT Application No. PCT/US19/55325.
International Search Report and Written Opinion mailed Jan. 4, 2019 in related PCT Patent Application No. PCT/US18/57539.
USPTO, Office Action issued in U.S. Appl. No. 18/653,381 on May 29, 2025, 11 pages.
USPTO, Final Office Action issued in U.S. Appl. No. 18/653,381 on Sep. 15, 2025, 7 pages.
Uspto, Notice of Allowance issued in U.S. Appl. No. 18/653,381 on Feb. 3, 2026, 9 pages (USWEL-007003).

* cited by examiner

CHEMICAL ADDITIVE TRAILER FOR HYDRAULIC FRACTURING OPERATIONS

TECHNICAL FIELD

The following description relates to a chemical additive trailer for hydraulic fracturing operations.

BACKGROUND

Hydraulic fracture treatments can be used to stimulate the production of hydrocarbon resources (e.g., oil, natural gas, etc.) from subterranean rock formations. During a fracture treatment, fracture treatment fluids are pumped under high pressure into the subterranean rock formation through a wellbore to fracture the formation and increase permeability and production from the formation. The fracture treatment fluid may include, for example, proppants and chemical additives that give the fracture treatment fluid certain properties.

DETAILED DESCRIPTION

In some aspects of what is described here, a chemical additive system operates to pump chemical additives from a chemical source for addition to a fracturing slurry. In some aspects, the chemical additive system includes a chemical additive trailer. In some aspects, the chemical additive trailer includes chemical pumps, electric motors, and variable frequency drives (VFDs). For instance, the electric motors are configured to drive the chemical pumps to pump the chemical additives, and the VFDs are configured to control the electric motors that drive the chemical pumps. In some aspects of what is described, the chemical additive system discharges chemical additives to a blender trailer (or other external unit or store of fracturing slurry) of a hydraulic fracturing operation at a well site. In some implementations, the chemical additive systems and techniques described here can be used to pump chemical additives at low flow rates including, for example, flow rates below 0.165 gallons per minute.

The chemical additive systems and techniques described here can provide technical advantages and improvements over conventional systems in some cases. For example, the systems and techniques described here can allow pumping of chemical additives at flow rates lower than conventional systems. This can provide benefits such as allowing the use of the chemical pumping system in a wider range of operating conditions where conventional systems are not able to be used. The chemical additive systems and techniques described here can provide benefits such as allowing smooth and continuous chemical pumping of chemical additives during operation in the supported range of operating conditions, which can simplify blending operations and enable easier real-time adjustments to chemical additive or fracturing slurry flow rates. The chemical additive systems and techniques described here can provide benefits such as allowing the use of chemical additive sources with higher concentrations due to the ability to pump the additives at low flow rates. For example, using higher concentration chemical additives can allow an operator to require a proportionally lower volume of chemicals at a well site, which can reduce the physical space needed for chemical additive storage and reduce the weight of the chemicals, both of which can allow more efficient well site layout and decrease the cost of transportation to the well site. The chemical additive systems described here can also provide the benefit of being highly mobile and maneuverable. For example, the chemical additive systems described here can have a smaller footprint than conventional systems and can be mounted to a trailer chassis for easy transport.

Figure 1:
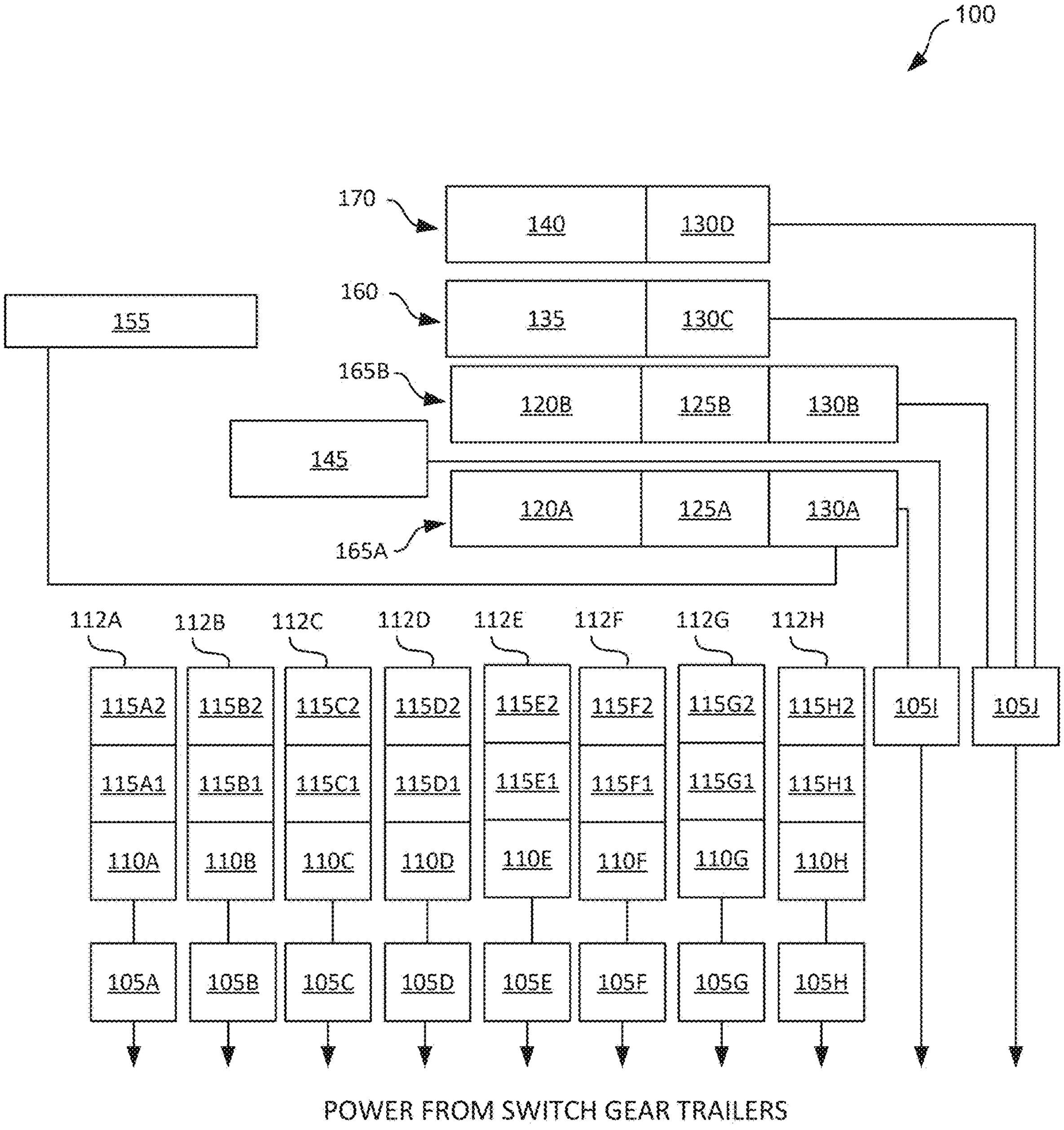
FIG. 1 is a block diagram showing an example arrangement of components of a hydraulic fracturing system at a well site.

FIG. 1 shows an overhead schematic view of an example of a hydraulic fracturing system 100 arrangement at a well site. In the illustrated example, power (e.g., up to about 13.8 kilovolts (kV) or more) can be supplied from a plurality of switchgear trailers (not shown) to a plurality of transformers 105A, 105B, 105C, 105D, 105E, 105F, 105G, 105H. The transformers 105A, 105B, 105C, 105D, 105E, 105F, 105G, 105H can supply power at a stepped-down voltage of down to about 600V or less to a plurality of variable frequency drive (VFD) houses 110A, 110B, 110C, 110D, 110E, 110F, 110G, 110H. The VFD housings 110A, 110B, 110C, 110D, 110E, 110F, 110G, 110H can each include one or more VFDs that in turn control power provided to a plurality of fracturing pumps 115A1, 115A2, 115B1, 115B2, 115C1, 115C2, 115D1, 115D2, 115E1, 115E2, 115F1, 115F2, 115G1, 115G2, 115H1, 115H2. Reference to a VFD housing should be understood to be interchangeable with and also refer to one or more VFDs (e.g., within a housing, that includes the VFD, such as cabinet 208 of FIG. 2) (e.g., 208A of FIG. 2), unless explicitly noted otherwise.

Each of the transformers, VFD housings, and fracturing pumps can be housed on a plurality of fracturing pump trailers 112A, 112B, 112C, 112D, 112E, 112F, 112G, 112H, arranged parallel with respect to each other, as in the illustrated embodiment. In other embodiments, the plurality of trailers may be arranged perpendicularly, in series, or in any other arrangement suitable for the hydraulic fracturing operation. In some embodiments, each VFD housing 110A, 110B, 110C, 110D, 110E, 110F, 110G, 110H is positioned on a trailer with two fracturing pumps 115A1, 115A2, 115B1, 115B2, 115C1, 115C2, 115D1, 115D2, 115E1, 115E2, 115F1, 115F2, 115G1, 115G2, 115H1, 115H2 positioned thereon, while the transformers 105A, 105B, 105C, 105D, 105E, 105F, 105G, 105H are positioned on separate trailers. In other embodiments, other combinations of transformers, VFD housings, and fracturing pumps can be arranged on one or more trailers. Although illustrated in FIG. 1 as having eight sets of transformers, VFD housings, and fracturing pumps, in other implementations, any number (e.g., 1, 2, 3, 6, 9, 10, 12, or more) of each element can be included in the hydraulic fracturing system 100.

In some embodiments, fracturing pumps 115A1, 115A2, 115B1, 115B2, 115C1, 115C2, 115D1, 115D2, 115E1, 115E2, 115F1, 115F2, 115G1, 115G2, 115H1, 115H2 can include electric, diesel, or dual-fuel fracturing pumps. The diesel or dual-fuel fracturing pumps can be used to supplement an electric fleet (of electric fracturing pumps). For example, the diesel or dual-fuel fracturing pumps can be fluidly connected to and combined with the fluid output of electric fracturing pumps. Together, the electric and non-electric fracturing pumps can be used to provide power for fracturing the well.

In the illustrated embodiment, two additional transformers 105I, 105J receive power (e.g., up to about 13.8 kV or more) from a switchgear trailer and provide a stepped-down voltage of down to about 600V or less to sand equipment 145, a hydration unit 160, blenders 165A, 165B, and/or a chemical additive system 170. Power from transformers 1051, 105J can also be indirectly supplied to data van 155 via a VFD housing 130A, 130B of one or more blenders 165A, 165B, according to the illustrated embodiment. In some implementations, power is supplied directly to data van 155.

In typical, hydraulically-powered systems, two or more auxiliary trailers (not shown) would be included in the hydraulic fracturing system 100 to house the hydraulic equipment and related power equipment such as VFDs, soft starters, motor control centers (MCCs), and breakers, for example. In the illustrated example, the two transformers 1051, 105J are provided in lieu of the two auxiliary trailers, as bulky hydraulic motors may not be needed to power the ancillary equipment. The remaining equipment typically stored on the auxiliary trailers, such as the VFDs, soft starters, motor control centers, and breakers, can be relocated to the individual trailers housing each of the hydration unit 160, blenders 165A, 165B, and chemical additive system 170. For example, according to an embodiment of the present disclosure, the entire hydraulic system typically positioned on and used to power each piece of ancillary equipment in known hydraulically-powered systems can be removed and replaced with a VFD housing.

Since the required equipment for the auxiliary trailer is partially or entirely eliminated by the substitution of electric power for hydraulic power, the embodiment illustrated in FIG. 1 can allow for elimination of the auxiliary trailer. With each of the VFDs, soft starters, MCCs, and breakers moved to respective blender 165A, 165B and hydration unit 160 trailers, the auxiliary trailer can be replaced with one or more transformers 1051, 105J.

Replacing the two typical auxiliary trailers with two 13.8 kV to 600V transformers 105I, 105J can conserve space at the hydraulic fracturing well site 100. The mixing equipment composed of two blenders 165A, 165B, a hydration unit 160, and a chemical additive system 170 can each include a VFD housing 130A, 130B, 130C, 130D, respectively, in place of where the hydraulic power equipment would have been positioned on each respective trailer, as discussed in more detail below.

In the illustrated example, the two blender units 165A, 165B can be powered through separate transformers 1051, 105J. This configuration can provide redundancy such that if one switchgear, turbine, or transformer has a failure, the other blender will still be operational for flushing the wellbore and maintaining circulation.

According to an embodiment, blenders 165A, 165B can operate very similarly to a fracturing pump, with only a transformer 105I, 105J supplying power to the trailer on which each blender 165A, 165B is positioned, and with all supporting breakers and controls being locally positioned at blenders 165A, 165B. These transformers 1051, 105J can be small, skid-mounted enclosures that can be positioned close to the blenders 165A, 165B at the hydraulic fracturing system 100 well site, and can include connections for two or more pieces of equipment. Each connection can include six cables plus a ground cable, according to an embodiment, where the six cables are composed of two cables for each of the three power phases. In other embodiments, other numbers and combinations of cables, ground cables, and power phases can be used.

Typical electric motors may use 600V, three-phase electrical power, according to some embodiments. Alternate embodiments may use 4160V, 480V, or any other feasible three-phase voltage instead. Single-phase alternating current (AC) voltage can be used as well, with voltages including but not limited to 120V or 240V. In some embodiments, DC voltage, for example having simplified controls (e.g., lack of a VFD) can be used for smaller motors, at voltages including 5V, 12V, 24V, 48V, or any other reasonable DC voltage.

In the illustrated example, hydration unit 160 includes a trailer positioned to house mixing vessels and fluid pumps 135 and a VFD housing 130C. For example, the hydration unit 160 can hold up to 300 barrel units (bbl) of fluid in a mixing vessel 135, according to an embodiment, and between 200 bbl to 225 bbl of fluid according to another embodiment. The hydration unit 160 can supplement the capabilities of the blenders 165A, 165B by pulling on fluid through a suction manifold. Typically, fluid pulling is provided by a hydraulically powered fluid pump; however, in an embodiment according to the present disclosure, fluid pulling can be provided instead by an electrically powered fluid pump. The electric motor operating the fluid pump can be positioned on the trailer housing hydration unit 160, for example between the mixing vessels and pumps 135 and VFD housing 130C in an embodiment, or under the VFD housing 130C in another embodiment.

The mixing vessel 135 of hydration unit 160 can be used to premix chemicals for use in hydraulic fracturing operations and can act as a buffer in the event of a fluid delivery problem. For example, if a fracturing stage is being pumped at a fluid rate of 70 barrels per minute (bpm) when water transfer to the well site is lost, the mixing vessel 135 can provide operators with a three-minute window to determine the problem causing the lost water transfer and to resume water transfer, or to flush the surface equipment and shut down pumping operations.

The mixing vessel 135 can include an instrumentation and control package, which can allow the mixing vessel 135 to monitor, for example, any of fluid rate, pressure, viscosity, pH, temperature, and chemical additive rates in either automatic or manual modes of operation. All valves, paddles, and pumps associated with the mixing vessel 135 can be controlled and powered through an onboard circuit positioned on the trailer housing hydration unit 160.

A plurality of small electric motors can be used with various components associated with the hydration unit 160. For example, an electric motor can be used to rotate mixing paddles in a large mixing compartment of the hydration unit 160, while another electric motor can be used with a suction manifold to pull of the fluid, and still another electric motor can be used for driving the chemical pumps associated with the hydration unit 160. Each electric motor can be positioned at various discrete positions about the hydration unit 160 trailer in some embodiments, or can be clustered in other embodiments.

Chemical additive system 170 can include a trailer positioned to house chemical pumps 140 and VFD housing 130D. In some embodiments, a fracturing fleet can utilize four or five chemical pumps, depending on the particular needs of the fracturing site, or consumer requirements. In some embodiments, the blender units 165A can include five to eight chemical pumps, although in other embodiments, one, two, three, four, nine, ten, or more chemical pumps can be included. In some embodiments, the hydration units 160 can additionally include five or more chemical pumps, although in other embodiments the hydration units 160 can include zero, one, two, three, or four chemical pumps, depending on particular fracturing site requirements or consumer preferences. In some embodiments, where both the blender units and the hydration units include chemical pumps, either the blender units 165A or the hydration units 160 can provide all the chemicals needed for the fracturing slurry. In such embodiments, either the blender units 165A or the hydration units 160 can serve as the primary chemical delivery method. Because of this redundancy, if either the blender unit or the hydration unit has a pump failure, the other, functioning unit can serve as a backup to provide the chemicals needed for the fracturing slurry. Thus, in some implementations, the blender units 165A, 165B can also contain chemical pumps 125A, 125B, such that the hydration unit 160 can serve as either the backup chemical delivery system to the chemical delivery system of the blender units 165, or as the primary chemical delivery system. This backup chemical delivery system may be advantageous, for example, in use with certain chemicals. For example, guar gel (an example of a viscosifier) needs time and fluid shear to properly mix and thicken, and accordingly should be added to the slurry mixture at the hydration unit 160. If added at one or more of the blenders 165A, 165B, guar gel may not have sufficient time to mix, and may result in an improper slurry viscosity, leading to less than ideal well production after the fracturing process is completed.

In some embodiments, chemical additive system 170 can serve as the primary source of chemicals for the fracturing slurry. In other embodiments, chemical additive system 170 can serve as the secondary or tertiary source of chemicals, after the hydration unit 160 and/or blenders 165A, 165B. The chemical additive system 170 can include several chemical pumps and vats (e.g., containers), and can be used to supplement the blenders 165A, 165B, particularly when the hydraulic fracturing operation requires multiple different chemicals or a particular chemical pump redundancy. In some embodiments, up to a dozen or more chemical pumps can be used with chemical additive system 170. In some embodiments, the chemical pumps can be configured for use with liquid chemicals, while in other embodiments the chemical pumps can be dry chemical augers. In the latter case, a small hopper with a small, screw-type auger can pull the powder chemical from the hopper, and can drop the powder chemical into a mixing tub. Each blender can include one or more of these hopper and auger combinations, in some embodiments. In other embodiments, a larger dry chemical additive system can be incorporated into a hydration unit with a large mixing tub.

Like the hydration unit 160 and blenders 165A, 165B, the chemical additive system 170 can be designed to be operated without the use of hydraulics, instead employing electric motors. The substitution of electrical power for hydraulic power can provide multiple advantages, as previously discussed, including saving space, enhancing reliability and versatility, improving ecological impact, being lighter, quieter, and safer, presenting fewer fire hazards. Additional examples of chemical additive system 170 are described in more detail below, including the chemical additive systems 202 and 302 described with respect to FIGS. 2-5

The one or more chemical pump 140 of chemical additive system 170 can include one or more electric motor, which can be stacked between the VFD housing 130D and the chemical additive system 170 in some embodiments, or can be installed underneath the VFD housing 130D in other embodiments. The electric motors can be small enough to be positioned in various configurations around the chemical pump 140 trailer. The electric motors can operate components of the chemical pump 140 in lieu of the use of hydraulic power, the latter of which is typically provided from one or more auxiliary trailers.

Blenders 165A, 165B can include slurry mixing units 120A, 120B, pumps 125A, 125B, and VFD housings 130A, 130D. The slurry mixing units 120A, 120B and pumps 125A, 125B can each be electrically coupled to a respective electric motor to drive operation of the mixing units and pumps. In an embodiment, blenders 165A, 165B can further include a battery powered electric hopper raise/lower system to facilitate "spotting" the blender during rig-in. This raise/lower system can allow a proppant hopper to be lowered into place before turbine power is connected, so that operators can see where the hopper will rest in relation to a sand conveyor. With the introduction of electrically actuated valves according to the present disclosure, the raise/lower system can be tied into that battery system. This can allow the blender operator to open a manifold crossover in the event of an electrical failure (e.g., turbine shutdown, ground fault, cable disconnection, breaker opening, etc.). The manifold crossover can be a pipe that spans from the suction manifold to the discharge manifold, bypassing the mixing tub, discharge pump, and metering instrumentation. This configuration also provides an added operational backup, in which, if the primary blender loses power, the raise/lower system can still open the manifold crossover to allow the hydration unit 160 to boost water through the inoperable primary blender manifold to the secondary blender without shutting down the fracturing operation. This can prevent millions of dollars wasted during downtime by maintaining circulation in the well to prevent a "screen out," in which additional nonproductive services such as coil tubing, flow back, or a workover rig will be required to clean out the well.

Attention is now directed to systems and techniques for pumping chemical additives. Some conventional chemical additive systems use diesel engines to drive chemical pumps for delivery of chemical additives to fracturing slurry. However, these conventional systems have several drawbacks due to the limitations imposed by diesel engines. Such conventional systems can be limited in how low of a fluid flow rate they can achieve, for example, due to the diesel engines needing to maintain a minimum rotational speed. To achieve lower flow rates some conventional systems must be operated according to a duty cycle where the chemical additive pump alternates between being on and off. However, operating the chemical additive pump in such a manner makes accurate and precise dosing of chemical additives difficult. As a result, conventional chemical additive systems are typically not used until the flow rate of the hydraulic fracturing slurry (e.g., into the wellbore) reaches at least 30-45 barrels per minute (bpm).

In some implementations, the chemical additive systems and techniques described here (e.g., with respect to FIGS. 2-5) can be used to pump chemical additives at low flow rates, for example, below 0.165 gallons per minute. For example, the systems and techniques described here have been successfully operated in a wide range of flow rates, from 0.084 gpm to 9.24 gpm. When deciding on chemical additive treatment for a fracturing slurry, an operator typically determines the amount of a chemical additive to add in units of gallons per thousand gallons (gpt) (e.g., gallons of chemical additive per thousand gallons of the mixed fracturing slurry). Being able to achieve low flow rates of down to 0.084 can allow an operator to use the chemical additive system at a fracturing slurry flow rate as low as 20 bpm (and up to 120 bpm) while maintaining the desired amount of chemical additive in gallons per thousand gallons of slurry. The result can be that an operator can begin chemical additive treatments earlier on in a hydraulic fracturing operation (e.g., while pumping into the wellbore and pressure builds), increasing the efficiency of the job. An example calculation is included below, showing that a chemical additive flow rate of 0.084 gpm at fracturing slurry pumping rate of 40 bpm allows chemical additive concentration of 0.05 gpt to be achieved. Likewise, a concentration of 0.1 gpt can be achieved for fracturing slurry pumping rate of 20 bpm.

$$\frac{0.05\text{ gal}}{1\text{ kgal}} \times \frac{40\text{ barrels}}{1\text{ min}} \times \frac{42\text{ gal}}{1\text{ barrels}} \times \frac{1\text{ kgal}}{1000\text{ gal}} = \frac{0.084\text{ gal}}{\text{min}}$$

The chemical additive systems and techniques described here can allow smooth and continuous chemical pumping of chemical additives during operation in the supported range of operating conditions due to the use of electric motors controlled by VFDs, which can simplify blending operations and enable easier real-time adjustments to chemical additive or fracturing slurry flow rates. As discussed previously, conventional systems using diesel engines can require cycling the engine on and off to achieve lower flow rates. However, the electric motors of the chemical additive systems described here can operate smoothly and continuously at low rotational speeds, and thus at low chemical pumping rates, due to the capability of the electric motors and control of the VFDs.

The chemical additive systems and techniques described here can allow an operator to use chemical additive sources with higher concentrations. For example, to achieve a desired concentration of chemical additive (in gallons per thousand) in the fracturing slurry using conventional systems, an operator must use a lower source concentration of chemical additives because the flow rate of the chemicals into the slurry cannot be lowered beyond a certain point (e.g., 0.165 gpm). However, if chemical additive can be pumped at lower flow rates into the fracturing slurry, the operator can use a higher concentration source of chemical additives to achieve the same concentration of chemical additive in the fracturing slurry (in gallons per thousand). Further, using higher concentration chemical additives can allow an operator to require a proportionally lower volume of chemicals at a well site, which can reduce the physical space needed for chemical additive storage and reduce the weight of the chemicals, both of which can allow more efficient well site layout and decrease the cost of transportation to the well site.

The chemical additive systems described here can also provide the benefit of being highly mobile and maneuverable. For example, the chemical additive systems described here can have a smaller footprint than conventional systems and can be mounted to a trailer chassis for easy transport. Conventional systems relying on diesel engines were limited in how small they can be made due to the larger space requirements of diesel engines and accompanying fuel sources, which are mitigated by the use of electric motors.

Figure 2:
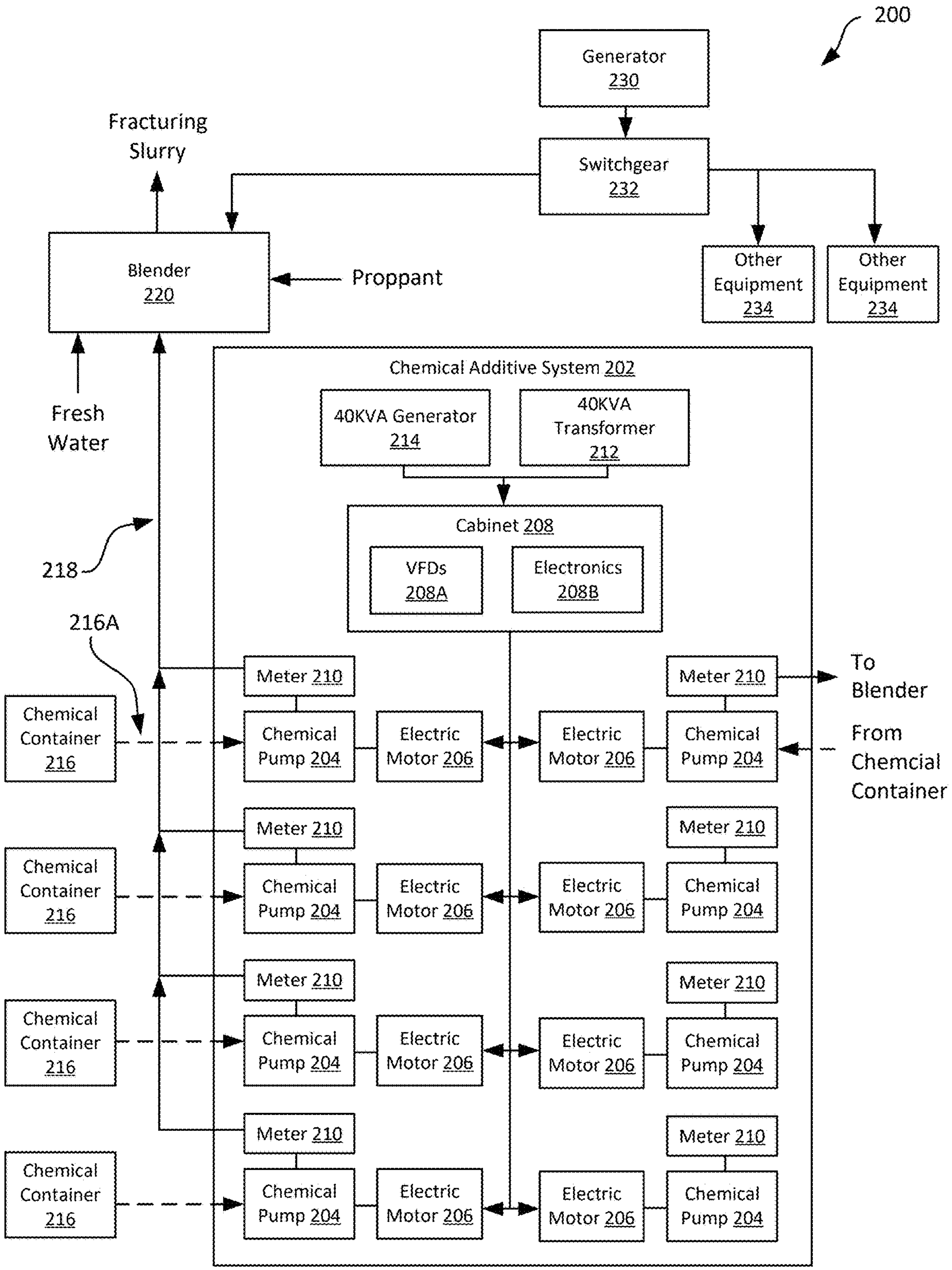
FIG. 2 is a system diagram showing an example chemical additive system.

FIG. 2 is a system diagram showing an example chemical additive system. As shown in FIG. 2, system diagram 200 includes chemical additive system 202 which is operatively connected to chemical containers 216, blender 220, and medium voltage switchgear 232. In some instances, the example chemical additive system 202 may be used at a well site for performing a hydraulic fracturing process.

As shown in FIG. 2, chemical additive system 202 includes chemical pumps 204. In some implementations, a chemical pump 204 is a positive displacement chemical pump. For example, a positive displacement pump is a type of pump used to move fluids from one place to another by trapping a fixed amount of fluid and then forcing that fluid into a discharge pipe or system. Positive displacement pumps can deliver a consistent and constant flow rate, regardless of changes in pressure or system resistance. In some embodiments, chemical pumps 204 include one or more other types of pumps for displacing fluid.

As shown in FIG. 2, chemical additive system 202 includes electric motors 206. In some implementations, an electric motor 206 is a component that converts electrical energy into mechanical energy. A wide variety of electric motors can be used in a chemical additive system 202 depending on the specific characteristics of the environment or operational demands. For example, an electric motor 206 can be selected based on one or more of its operational ratings such as power output, rotational speed, voltage rating, and phase. For instance, a 5 horsepower (HP) electric motor having a maximum rotational speed rating of 1750 revolutions per minute (RPM) can be used. In some implementations, electric motors 206 include motors having the same or different sizes (e.g., physical sizes or sizes of operational ratings). For example, electric motors 206 can include six 5 HP motors as described above and two 10 HP that are larger in physical size and larger in size of power output (and thus are of a different size than) the 5 HP motors. For instance, the 10 HP motors can be capable of generating higher torque or rotational speed than the 5 HP motors, and can be used under certain operational scenarios (e.g., for pumping high viscosity fluids such as viscosifiers).

As shown in FIG. 2, chemical additive system 202 includes cabinet 208. In some implementations, cabinet 208 includes VFDs 208A. In some implementations, VFDs are located outside of cabinet 208. VFDs 208A include one or more VFD that is used to control electric motors 206. For example, a VFD 208A is an electronic device used to control the speed and torque of an electric motor by varying the frequency and voltage of the electrical power supplied to the motor. VFDs can be used to achieve energy savings, precise control, and increased efficiency in motor-driven systems. In some implementations, a VFD 208A includes one or more of the following components: a converter, a direct current (DC) bus, an inverter, a control panel, and a feedback system. For example, VFD 208A includes a converter (or rectifier) at its input, which converts the incoming AC power from the power source into DC power which is then used in the next stages of the VFD. For example, the DC bus can act as an intermediate energy storage component, smoothing out fluctuations in the power supply and providing a stable source of DC power for the VFD's inverter stage. For example, the inverter converts the DC power from the DC bus back into variable-frequency AC power. In some implementations, VFD 208A controls the speed and torque of the connected electric motor by adjusting the frequency and voltage of this AC power output. For example, VFD 208A includes a control panel (or interface) that allows users to set and adjust various parameters, including motor speed, acceleration, deceleration, and direction of rotation. For example, VFD 208A includes a feedback system that includes sensors (or otherwise incorporates feedback from sensors) such as encoders or tachometers to measure the coupled motor's speed and adjust the output accordingly.

In some implementations, cabinet 208 includes electronics 208B used to control operations of the chemical additive system 202. For example, electronics 208B can include one or more control systems. In some implementations, the control systems can include one or more computing devices or systems (e.g., such as computer system 600 of FIG. 6) associated with one or more of the components shown in FIG. 2 (e.g., embodied in electronics 208B and optionally located in the cabinet 208). In some implementations, the control systems may include computing devices or systems that are separate from the components shown in FIG. 2 (e.g., some or all components of the control system are located external to chemical additive system 202 and in a data van, at a remote data center, or in the cloud). In some implementations, a control system can monitor and control the chemical additives supplied by the chemical additive system 202. The control system may receive data collected or generated by the chemical additive system 202, and the control system may process the data or otherwise use the data to select or modify operating parameters. For example, the control system may initiate control signals that configure or reconfigure components of the chemical additive system 202 or other equipment based on selected or modified properties.

In some implementations, chemical additive system 202 includes a housing (e.g., cabinet 208) installed on a chemical additive trailer (e.g., 410). For example, the housing houses the variable frequency drives (e.g., 208A) and electronics (e.g., 208B). In some implementations, chemical additive system 202 includes at least eight chemical pumps (e.g., 204) installed on the chemical additive trailer; the at least eight chemical pumps are configured to pump chemical additives from at least four distinct chemical sources (e.g., 216) to the at least one blender trailer (e.g., 220).

In some implementations, a control system includes one or more interfaces that enable an operator to set characteristics or parameters of the chemical additive system 202. For example, a control system can include a digital control panel that includes input and output devices (e.g., mouse, keyboard, display, and/or touchscreen display) usable by an operator to set and monitor chemical additive flow rates. For instance, the control panel can display real-time data and allow for adjustments as needed. In some implementations, the control system provides an interface to an external control system component. For example, the interface can allow remote monitoring and control for enhanced operational efficiency. In some implementations, the interface includes components enabling wired connectivity (e.g., Ethernet, coaxial, and/or fiber optic) and/or or wireless connectivity (e.g., 3G, 4G, LTE, 5G, 6G, and/or Wi-Fi).

In some implementations, cabinet 208 includes one or more power conversion components. For example, transformer 212 or generator 214 can output three phase 480V power in some implementations, and cabinet 208 can include converters for creating low voltage power for onboard electronics 208B.

In some implementations, chemical additive system 202 includes (or performs) one or more safety features. For example, chemical additive system 202 can include one or more leak detection sensors placed throughout the system to detect any leaks or abnormalities and trigger automatic shutdown if necessary. For example, chemical additive system 202 can include an emergency stop button that allows immediate cessation of chemical flow in case of emergencies.

As shown in FIG. 2, chemical additive system 202 includes flow meters 210. For example, flow meter 210 can measure the flow rate of chemical additives with sufficient accuracy and precision, even at low flow rates. In some implementations, a flow meter 210 can be required to measure flow rates from as low as 0.084 gallons per minute (gpm) to as high as 9.24 gpm. Flow meters 210 can be arranged and configured to measure the flow rate of chemical additives output from chemical pumps 204. As shown in FIG. 2, each chemical pump 204 can be configured with a respective flow meter 210 measuring the output of the pump. In some implementations, measurements of flow meters 210 are used as feedback in a closed loop control system (a feedback control loop) (e.g., to adjust control signals to a VFD for controlling a motor that drives a chemical pump). For example, electronics 208B can receive the measurements of flow meters 210 and cause VFDs 208A to adjust their output. In some cases, VFDs 208A receive output from the flow meters 210.

As shown in FIG. 2, chemical additive system 202 includes transformer 212. In FIG. 2, transformer 212 is a transformer rated at 40 kilo-volt-amperes (kVA), which is capable of providing enough power to the chemical additive system 202. Transformer 212 is connected to and receives input power from a generator 230 via a switchgear 232. In some implementations, generator 230 is a gas turbine that generates electricity for equipment at the well site (e.g., for chemical additive system 202, blender 220, and/or other equipment 234). Other types of generators can be used. In some implementations, transformer 212 receives input power from a utility source rather than an on-site generator. In some implementations, chemical additive system 202 does not include a transformer. For example, chemical additive system 202 can include generator 214 without including transformer 212.

As shown in FIG. 2, chemical additive system 202 includes generator 214. In FIG. 2, generator 214 is a generator rated at 40 kVA, which is capable of providing enough power to the chemical additive system 202. In some implementations, generator 214 is located on chemical additive system 202 and is used to generate electrical power for the components of chemical additive system 202. For example, if connection to an external power source (e.g., generator 230) is not available or not feasible, an operator has the option to use on-board generator 214 as a power source for operation of chemical additive system 202. In some implementations, generator 214 is a diesel generator, gas turbine, or another type of generator. In some implementations, chemical additive system 202 does not include a generator. For example, chemical additive system 202 can include transformer 212 without including generator 214. As shown in FIG. 2, chemical additive system 202 can include both transformer 212 and generator 214, which can provide an operator with different options for powering the system.

The input or output voltages of the power supply components (e.g., transformer 212 and generator 214) of chemical additive system 202 can depend on the needs of the operator and the components selected. For example, transformer 212 can be configured to use three phase input at 25 kilovolts (kV), 13.8 kV, 4160V, or 2000V at the primary side (e.g., from switchgear 232). For example, transformer 212 and/or generator 214 can be configured to supply three phase output at 4160V, 720V, 690V, 600V, or 480V, or to supply 240V split phase output. For example, if chemical additive system 202 includes both transformer 212 and generator 214, they can both be configured to output 480V to power all of the VFDs 208A (and thereby the motors and pumps) and onboard electronics 208B.

As shown in FIG. 2, chemical additive system 202 is connected to chemical containers 216 via chemical input connections 216A. For example, chemical input connections 216A can be connected to corresponding pump inlets of chemical pumps 204. During operation, chemical pumps 204 will pull chemical additives from chemical input containers 216 via chemical input connections 216A and output the additives at a specified flow rate via a pump outlet of the pump. Examples of chemical additives that can be pumped using chemical additive system 202 include surfactants (e.g., for reducing surface tension in liquids, making them effective in hydraulic fracturing), scale inhibitors (e.g., for preventing the formation of scale deposits in pipelines, equipment, and processes), clay stabilizers (e.g., for mitigating clay swelling and dispersion), and corrosion inhibitors (e.g., for protecting metal surfaces from corrosion). In some implementations, chemical pumps 204 are used to pump a viscosifier from chemical containers 216, such as a chemical or solution for increasing the viscosity of a fracturing slurry. In some implementations, chemical containers 216 are designed to withstand various chemical properties and are equipped with safety measures to prevent leaks and spills.

In some implementations, chemical containers 216 include containers that hold different chemicals. For example, a first chemical container (of chemical containers 216) can include a surfactant that is pumped by a first chemical pump (of chemical pumps 204) and a second chemical container (of chemical containers 216) can include a scale inhibitor that is pumped by a second, different chemical pump (of chemical pumps 204). In the scenario where chemical containers 216 includes different chemicals, each chemical can be pumped simultaneously and independently of each other. For example, a first chemical additive can be pumped at a first chemical additive flow rate and a second chemical additive can be pumped at a second, different chemical additive flow rate. In some implementations, multiple chemical pumps are connected to and supplied by a single chemical container 216.

In the example in FIG. 2, chemical containers 216 are external to chemical additive system 202. In some implementations, one or more chemical containers 216 are part of (e.g., located on) chemical additive system 202. For example, the compact and efficient footprint of the illustrated components of chemical additive system 202 and the ability to use higher concentration (and thus a lower volume) of chemicals can enable the chemical containers to be located on the same trailer as the VFDs, motors, and pumps.

As shown in FIG. 2, chemical additive system 202 is connected to blender 220 via chemical output connections 218. In some implementations, chemical output connections 218 represent the output (e.g., discharge) of the chemical pumps 204. In the example in FIG. 2, the chemical output connections 218 of each chemical pump 204 combine and flow to blender 220. In some implementations, one or more of chemical output connections 218 from respective chemical pumps 204 do not combine (e.g., flow independently to the blender). Blender 220 can also receive other inputs, such as of water and/or proppant, in addition to chemical additives from chemical additive system 202. In some implementations, blender 220 mixes these inputs together to form a fracturing slurry. This fracturing slurry can then be pumped down into the wellbore using several hydraulic fracturing pumps as described previously. In some implementations, blender 220 includes one or more of the features described above with respect to blender 165A or blender 165B (also variously referred to as blender unit or blender trailer). As used herein, reference to a blender, a blender unit, or a blender trailer can be interpreted as interchangeable with another component or unit that performs the same or similar functions. For example, a hydration unit (e.g., 160) can perform mixing of fluids and chemicals to supplement or replace functionality of a blender, as described above. Accordingly, one of ordinary skill in the art would recognize that, for example, providing chemical output to a blender (e.g., 220 in FIG. 2) can be understood to include "to" or "via" a hydration unit or other component for blending fracturing slurry components.

Figure 3:
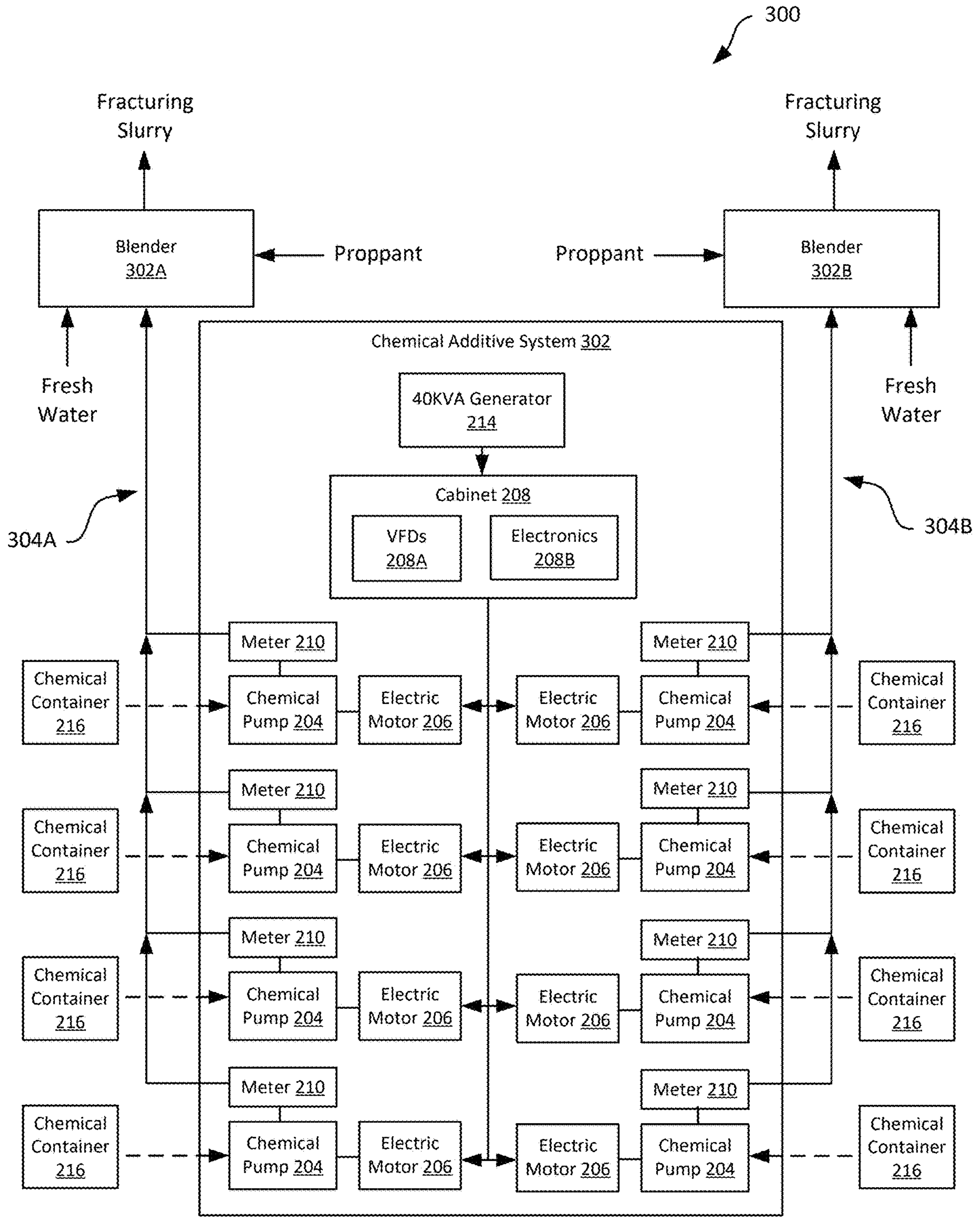
FIG. 3 is a block diagram showing an example chemical additive system.

FIG. 3 is a system diagram showing an example chemical additive system. As shown in FIG. 3, system diagram 300 includes chemical additive system 302 which is operatively connected to chemical containers 216 (e.g., as described above). With the exception of the configuration differences noted below, the features and operations described above with respect to chemical additive system 202 apply equally to chemical additive system 302, and are hereby incorporated by reference. In FIG. 3, chemical additive system 302 is shown in a different configuration and operating context than chemical additive system 202 in FIG. 2. In the example in FIG. 3, chemical additive system 302 includes a generator (e.g., generator 214), but does not include a transformer, so power generation for VFDs, motors, and onboard electronics are generated onboard using the generator. In FIG. 3, chemical additive system 302 is used to pump chemical additive to two separate blenders: to a first blender 302A via a chemical output connection 304A and to a second blender 302B via a chemical output connection 304B. For example, chemical output connection 304A can be used to simultaneously output the same or different chemical additives than chemical output connection 304B. For instance, the chemical containers 216 supplying the respective pumps can include the same or different chemical additives.

In some implementations, chemical additive system 302 includes a housing (e.g., cabinet 208) installed on a chemical additive trailer (e.g., 410). For example, the housing houses the variable frequency drives (e.g., 208A) and electronics (e.g., 208B). In some implementations, chemical additive system 202 includes at least eight chemical pumps (e.g., 204) installed on the chemical additive trailer; the at least eight chemical pumps are configured to pump chemical additives from at least four distinct chemical sources (e.g., 216) to the at least one blender trailer (e.g., 302A, 302B).

In some instances, a chemical additive system can be implemented as the example chemical additive systems 202 or 302 shown in FIGS. 2 and 3 or implemented in another manner. In some instances, the chemical additive system can perform one or more of the operations in the example process 500 shown in FIG. 5 or in another manner.

It should be noted that the operating configurations shown in the examples in FIGS. 2 and 3 are merely examples and should not be construed as strictly limiting the uses of configurations of a chemical additive system. For example, chemical additive system 202 or 302 can be configured to pump chemical additives to a different number of blenders using a different configuration of pumps (e.g., 6 pumps to one blender and 2 pumps to another blender).

Figure 4:
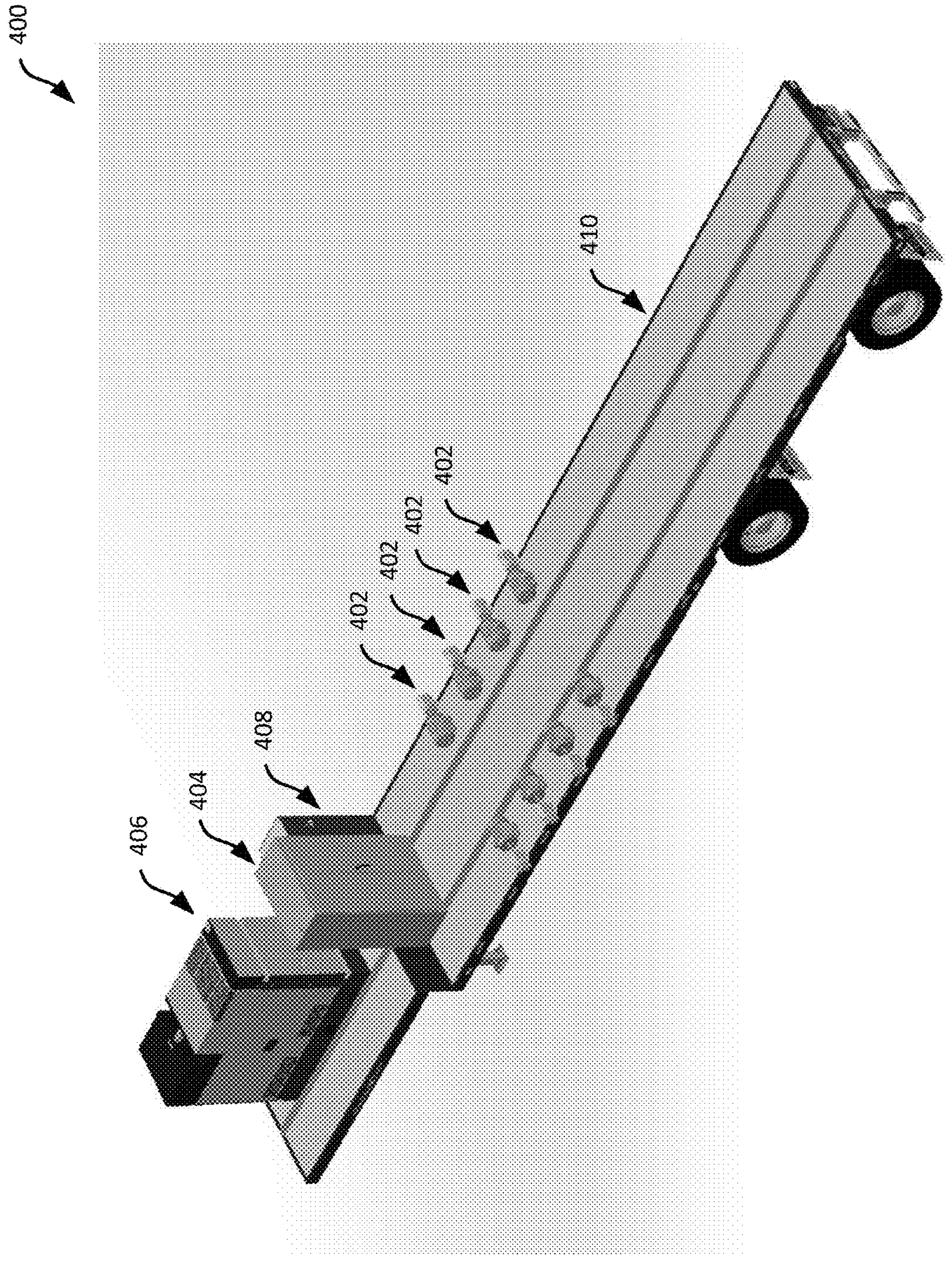
FIG. 4 is a perspective view showing an example chemical additive trailer.

FIG. 4 is a perspective view showing an example chemical additive system. Chemical additive system 400 shown in FIG. 4 can include one or more of the features describe above, for example, with respect to chemical additive systems 202 and 302 of FIGS. 2 and 3. As shown in FIG. 4, chemical additive system 400 includes multiple assemblies 402. Each assembly 402 includes a chemical pump (e.g., 204), an electric motor (e.g., 206), and a flow meter (e.g., 210). Chemical additive system 400 includes a cabinet 404 (e.g., as described with respect to cabinet 208) that includes VFDs (e.g., 208A) and electronics (e.g., 208B). Chemical additive system 400 includes a temperature control unit 408, which is an optional component in some implementations of a chemical additive system. In some implementations, a temperature control unit includes one or more components configured to cool one or more components of the chemical additive system. For example, temperature control unit 408 can include an air conditioning unit. In some implementations, a temperature control unit includes one or more components configured to heat one or more components of the chemical additive system. For example, temperature control unit 408 can include a heating unit that enables the chemical additive system to operate at low ambient air temperatures. Chemical additive system 400 includes a generator 406 (e.g., as described with respect to generator 214). The components of a chemical additive system can be connected and configured as described above with respect to FIGS. 2 and 3.

As shown in FIG. 4, chemical additive system 400 includes a trailer 410 (e.g., a trailer chassis). The components of chemical additive system 400 are mounted to a trailer 410 for easy transport and maneuverability. In some implementations, the trailer is a standard length trailer (e.g., 48 to 53 feet in length). In some implementations, the trailer is shorter than standard length (e.g., between 16 and 48 feet in length). In some implementations, the components of a chemical additive system are mounted to a skid or pallet (e.g., instead of to trailer 410).

Figure 5:
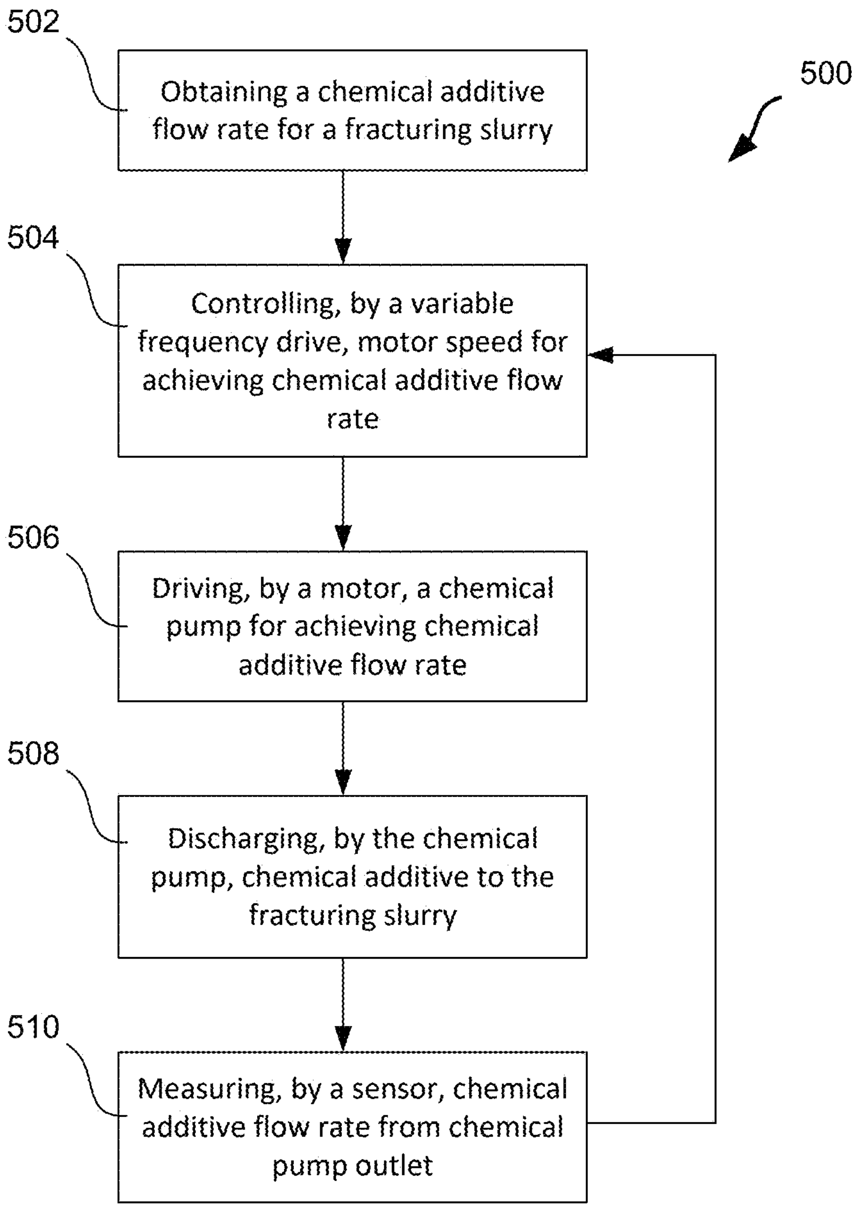
FIG. 5 is a flow chart showing aspects of an example process of pumping chemical additives.

FIG. 5 is a flow chart showing aspects of an example process of pumping chemical additives. The example process 500 can be used, for example, to operate a chemical additive system, e.g., the example chemical additive system 202 or 302 in FIGS. 2 and 3. For instance, the example process 500 can be used to pump chemical additives at a specified chemical additive flow rate. The example process 500 may include additional or different operations, including operations performed by additional or different components, and the operations may be performed in the order shown or in another order. In some implementations, one or more operations in the example process 500 can be performed by a computer system, for instance, by a digital computer system having one or more digital processors (e.g., processor 610 in FIG. 6) that execute instructions (e.g., instructions stored in memory 620 in FIG. 6, forming a computer program 624).

At 502, the chemical additive system (e.g., 202) obtains a specified chemical additive flow rate for a fracturing slurry. In some implementations, the specified chemical additive flow rate is obtained via user input at a component of a chemical additive system (e.g., at a control panel of chemical additive system 202 of FIGS. 2 and 3). In some implementations, the specified chemical additive flow rate is obtained via an interface of a control system (e.g., embodied in electronics 208B of FIG. 2). For example, the flow rate can be obtained via a wired or wireless interface from an external source such as a data van, off-site control center, or from a cloud location. In such example, the specified flow rate can be specified via user input received or processed at the external source (e.g., by an operator in the data van).

At 504, the chemical additive system (e.g., 202) controls, using a VFD (e.g., 208A), motor speed of a motor (e.g., 206) for achieving the specified chemical additive flow rate. For example, a VFD 208A of chemical additive system 202 can be used to control the motor speed of electric motor 206. In some implementations, the chemical additive system controls multiple VFDs to control the motor speed of multiple electric motors for achieving the specified chemical additive flow rate. For example, a control system of the chemical additive system (e.g., in electronics 208B and/or onboard the VFD 208A) can cause (e.g., instruct) the VFD to output control signals having certain characteristics (e.g., amplitude and/or frequency) for controlling a coupled motor. In some implementations, the specified chemical additive flow rate is a target flow rate output of a single chemical pump or of a combination of multiple chemical pumps.

At 506, the chemical additive system (e.g., 202) drives, by a motor (e.g., 206), a chemical pump (e.g., 204) for achieving the specified chemical additive flow rate. For example, a VFD of the chemical additive system outputs control signals that cause the motor to rotate at a rotational speed configured to drive the chemical pump to discharge chemical additive at the specified chemical additive flow rate. In some implementations, the chemical additive system controls multiple motors to drive multiple chemical pumps for achieving the specified chemical additive flow rate.

At 508, the chemical additive system (e.g., 202) discharges, by the chemical pump, the chemical additive to the fracturing slurry (e.g., to blender 220). In some implementations, discharging the chemical additive includes providing the chemical additive to a blender trailer for addition to the fracturing slurry produced by the blender trailer. In some implementations, the chemical additive system discharges chemical additive from multiple chemical pumps to the fracturing slurry.

At 510, the chemical additive system (e.g., 202) measures, by a sensor (e.g., flow meter 210), a chemical additive flow rate from the chemical pump outlet. In some implementations, the chemical additive system measures multiple chemical additive flow rates at multiple chemical pump outlets. In some implementations, the chemical additive system uses the measured chemical additive flow rate in a feedback control loop (e.g., of a control system of electronics 208B or external to the chemical additive system). For example, the chemical additive system uses the measured chemical additive flow rate as feedback for adjusting control signals output by a VFD (e.g., control loop returns to 504 to control the VFD). For example, if the measured flow rate is lower than the specified flow rate, then the VFD can increase motor speed to increase pumping rate of the chemical pump; if the measured flow rate is higher than the specified flow rate, then the VFD can decrease motor speed to decrease pumping rate of the chemical pump.

Figure 6:
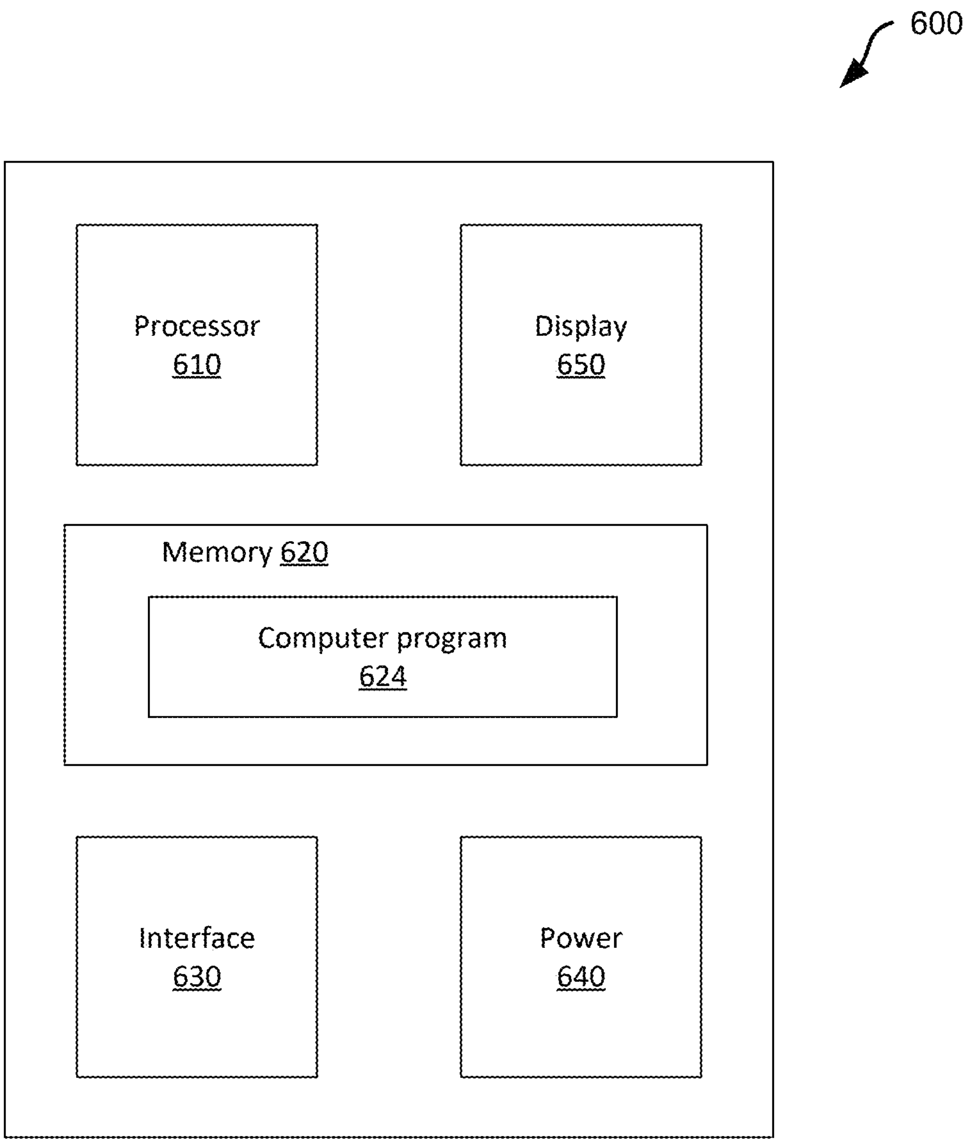
FIG. 6 is a block diagram showing an example computer system.

FIG. 6 is a block diagram showing an example computer system 600 that includes a data processing apparatus and one or more computer-readable storage devices. Some of the components and/or functions described above can include and/or be performed by one or more features of computer system 600. For example, electronics 208B or the control systems described above can be performed using one or more features of computer system 600. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 610. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 624, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 610, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 620. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 640 provides power to the other components of the computer system 600. For example, the other components may operate based on electrical power provided by the power unit 640 through a voltage bus or other connection. In some implementations, the power unit 640 includes a battery or a battery system, for example, a rechargeable battery. In some implementations, the power unit 640 includes an adapter (e.g., an AC adapter) that receives an external power signal (from an external source) and converts the external power signal to an internal power signal conditioned for a component of the computer system 600. The power unit 640 may include other components or operate in another manner.

To provide for interaction with a user, operations can be implemented on a computer having a display device, e.g., display 650, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 600 may include a single computing device or multiple computers that operate in proximity or generally remote from each other and typically interact through a communication network, e.g., via interface 630. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 630 may provide communication with other systems or devices. In some cases, the interface 630 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 630 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, a chemical additive system pumps chemical additives for addition to a fracturing slurry.

In a first example, a method of providing chemical additives for hydraulic fracture treatments includes operating at least one (e.g., one or more) chemical pump installed on a chemical additive trailer to pump chemical additives from at least one chemical source to at least one blender trailer. Operating a chemical pump of the at least one chemical pump includes: receiving, at a pump inlet of the chemical pump, a chemical additive from a chemical source; discharging, at a pump outlet of the chemical pump, the chemical additive at a specified chemical additive flow rate, wherein the specified chemical additive flow rate is below 0.165 gallons per minute (gpm); and providing the chemical additive from the pump outlet to a blender trailer for addition to a fracturing slurry produced by the blender trailer. The method includes operating at least one electric motor installed on the chemical additive trailer to drive the at least one chemical pump. The method includes operating at least one variable frequency drive installed on the chemical additive trailer to control the at least one electric motor.

Implementations of the first example may include one or more of the following features. The specified chemical additive flow rate is between 0.084 gpm and 0.165 gpm. The at least one electric motor includes: a first motor having a first size; and a second motor having a second size different from the first size. The method further includes measuring a flow rate of the pump outlet of the chemical pump. While operating the at least one chemical pump, a fracturing slurry flow rate of the fracturing slurry produced by the blender trailer is between 20 barrels per minute (bpm) and 120 bpm. Operating the at least one chemical pump continuously while the fracturing slurry flow rate is between 20 bpm and 120 bpm. The chemical additive system includes a transformer that provides power to operate the at least one electric motor. The chemical additive system includes a generator that provides power to operate the at least one electric motor. The chemical additive is a viscosifier.

In a second example, a chemical additive system is configured to provide chemical additives for hydraulic fracture treatments. The chemical additive system includes a chemical additive trailer and at least one chemical pump installed on the chemical additive trailer. The at least one chemical pump is configured to pump chemical additives from at least one chemical source to at least one blender trailer. A chemical pump of the at least one chemical pump is configured to: receive, at a pump inlet of the chemical pump, a chemical additive from a chemical source; discharge, at a pump outlet of the chemical pump, the chemical additive at a specified chemical additive flow rate, wherein the specified chemical additive flow rate is below 0.165 gallons per minute (gpm); and provide the chemical additive from the pump outlet to a blender trailer for addition to a fracturing slurry produced by the blender trailer. The chemical additive system includes at least one electric motor installed on the chemical additive trailer and configured to drive the at least one chemical pump. The chemical additive system includes at least one variable frequency drive installed on the chemical additive trailer and configured to control the at least one electric motor.

Implementations of the second example may include one or more of the following features. The specified chemical additive flow rate is between 0.084 gpm and 0.165 gpm. The at least one electric motor includes: a first motor having a first size; and a second motor having a second size different from the first size. The system includes a flow meter configured to measure a flow rate of the pump outlet of the chemical pump. The chemical additive system includes a transformer that provides power to operate the at least one electric motor. The chemical additive system includes a generator that provides power to operate the at least one electric motor. The chemical additive system includes a housing installed on the chemical additive trailer; the housing houses the at least one variable frequency drive and electronics. The chemical additive system includes at least eight chemical pumps installed on the chemical additive trailer; the at least eight chemical pumps are configured to pump chemical additives from at least four distinct chemical sources to the at least one blender trailer. The chemical additive is a viscosifier. A first subset of the at least one chemical pump is configured to pump chemical additives from a first subset of chemical sources to a first blender trailer, and a second subset of the at least one chemical pump is configured to pump chemical additives from a second subset of chemical sources to a second blender trailer. Each of the at least one chemical pump is configured to pump chemical additives from a respective one of the chemical sources to the at least one blender trailer.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:

operating a plurality of chemical pumps installed on a chemical additive trailer to pump respective chemical additives from respective chemical sources to a blender trailer, each of the respective chemical sources comprising a respective chemical container disposed on the chemical additive trailer, wherein operating a first chemical pump of the plurality of chemical pumps comprises:

receiving, at a pump inlet of the first chemical pump, a first chemical additive from a first chemical source of the respective chemical sources;

discharging, at a pump outlet of the first chemical pump, the first chemical additive at a specified chemical additive flow rate, wherein the specified chemical additive flow rate is below 0.165 gallons per minute (gpm); and providing the first chemical additive from the pump outlet to the blender trailer for addition to a fracturing slurry produced by the blender trailer;

operating a plurality of electric motors installed on the chemical additive trailer, wherein each electric motor of the plurality of electric motors drives a respective chemical pump of the plurality of chemical pumps, and a first electric motor of the plurality of electric motors drives the first chemical pump; and operating a plurality of variable frequency drives installed on the chemical additive trailer, wherein each variable frequency drive of the plurality of variable frequency drives controls a respective electric motor of the plurality of electric motors, and a first variable frequency drive of the plurality of variable frequency drives controls the first electric motor.

2. The method of claim 1, wherein the specified chemical additive flow rate is between 0.084 gpm and 0.165 gpm.

3. The method of claim 1, comprising:

operating the first electric motor of the plurality of electric motors to drive the respective chemical pump of the plurality of chemical pumps, the first electric motor having a first size; and operating a second electric motor of the plurality of electric motors to drive a second chemical pump of the plurality of chemical pumps, the second electric motor having a second size different from the first size.

4. The method of claim 1, comprising:

measuring a flow rate of the pump outlet of the first chemical pump.

5. The method of claim 1, wherein, while operating the plurality of chemical pumps, a fracturing slurry flow rate of the fracturing slurry produced by the blender trailer is between 20 barrels per minute (bpm) and 120 bpm.

6. The method of claim 5, comprising operating the plurality of chemical pumps continuously while the fracturing slurry flow rate is between 20 bpm and 120 bpm.

7. The method of claim 1, comprising, by operation of a transformer, transforming electric power provided to operate the plurality of electric motors.

8. The method of claim 1, comprising, by operation of a generator, generating electric power to operate the plurality of electric motors.

9. The method of claim 1, wherein the chemical additive is a viscosifier.

10. A chemical additive system comprising:

a chemical additive trailer;

a plurality of chemical containers installed on the chemical additive trailer;

a plurality of chemical pumps installed on the chemical additive trailer, the plurality of chemical pumps being configured to pump respective chemical additives from respective chemical sources to a blender trailer, each of the respective chemical sources comprising a respective chemical container of the plurality of chemical containers disposed on the chemical additive trailer, wherein a first chemical pump of the plurality of chemical pumps is configured to:

receive, at a pump inlet of the first chemical pump, a first chemical additive from a first chemical source of the respective chemical sources;

discharge, at a pump outlet of the first chemical pump, the first chemical additive at a specified chemical additive flow rate, wherein the specified chemical additive flow rate is below 0.165 gallons per minute (gpm); and provide the first chemical additive from the pump outlet to the blender trailer for addition to a fracturing slurry produced by the blender trailer;

a plurality of electric motors installed on the chemical additive trailer, each electric motor of the plurality of electric motors configured to drive a respective chemical pump of the plurality of chemical pumps, wherein a first electric motor of the plurality of electric motors is configured to drive the first chemical pump;

a plurality of variable frequency drives installed on the chemical additive trailer, each variable frequency drive of the plurality of variable frequency drives configured to control a respective electric motor of the plurality of electric motors, wherein a first variable frequency drive of the plurality of variable frequency drives is configured to control the first electric motor.

11. The system of claim 10, wherein the specified chemical additive flow rate is between 0.084 gpm and 0.165 gpm.

12. The system of claim 10, comprising:

the first electric motor of the plurality of electric motors configured to drive the respective chemical pump of the plurality of chemical pumps, the first electric motor having a first size; and a second electric motor of the plurality of electric motors configured to drive a second chemical pump of the plurality of chemical pumps, the second electric motor having a second size different from the first size.

13. The system of claim 10, comprising:

a flow meter configured to measure a flow rate of the pump outlet of the first chemical pump.

14. The system of claim 10, comprising a housing installed on the chemical additive trailer, wherein the housing houses the plurality of variable frequency drives and electronics.

15. The system of claim 10, comprising at least eight chemical pumps installed on the chemical additive trailer, wherein the at least eight chemical pumps are configured to pump a plurality of chemical additives from at least four distinct chemical sources to the blender trailer.

16. The system of claim 10, comprising a transformer that provides power to operate the plurality of electric motors.

17. The system of claim 10, comprising a generator that provides power to operate the plurality of electric motors.

18. The system of claim 10, wherein the chemical additive is a viscosifier.

19. The system of claim 10, comprising:

a first subset of chemical pumps configured to pump chemical additives from a first subset of chemical sources to a first blender trailer, and a second subset of chemical pumps configured to pump chemical additives from a second subset of chemical sources to a second blender trailer.

* * * * *